United States Patent
Lu et al.

(10) Patent No.: US 12,507,492 B2
(45) Date of Patent: Dec. 23, 2025

(54) DETECTION SUBSTRATE AND DETECTION CIRCUIT

(71) Applicant: Shanghai Tianma Micro-electronics Co., Ltd., Shanghai (CN)

(72) Inventors: Haotian Lu, Shanghai (CN); Linzhi Wang, Shanghai (CN); Baiquan Lin, Shanghai (CN); Kerui Xi, Xiamen (CN); Shun Gong, Shanghai (CN); Yukun Huang, Xiamen (CN); Fan Xu, Shanghai (CN); Kaidi Zhang, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 471 days.

(21) Appl. No.: 18/090,202

(22) Filed: Dec. 28, 2022

(65) Prior Publication Data

US 2024/0128283 A1    Apr. 18, 2024

(30) Foreign Application Priority Data

Oct. 12, 2022 (CN) .......................... 202211249325.4

(51) Int. Cl.
*H10F 39/00* (2025.01)
*G01N 21/64* (2006.01)

(52) U.S. Cl.
CPC ......... *H10F 39/802* (2025.01); *G01N 21/645* (2013.01); *G01N 21/6428* (2013.01)

(58) Field of Classification Search
CPC ................ H10F 39/802; G01N 21/645; G01N 21/6428; G01N 27/4145; Y02E 10/549
See application file for complete search history.

(56) References Cited

U.S. PATENT DOCUMENTS

2023/0230969 A1 * 7/2023 Yang .................. G06V 40/1318
257/82

FOREIGN PATENT DOCUMENTS

| CN | 108620143 A | 10/2018 |
|---|---|---|
| CN | 110296963 A | 10/2019 |
| CN | 113014837 A | 6/2021 |
| CN | 214157295 U | 9/2021 |
| CN | 113751089 A | 12/2021 |
| JP | 2018113902 A | 7/2018 |

* cited by examiner

*Primary Examiner* — Tucker J Wright
(74) *Attorney, Agent, or Firm* — Anova Law Group, PLLC

(57) ABSTRACT

A detection substrate including a substrate and a plurality of detection units disposed on a side of the substrate, each detection unit including at least an inorganic transistor, an organic transistor, and a photoelectric sensor element, the organic transistor including an organic semiconductor part, in a direction perpendicular to a plane of the substrate, a film layer where the organic semiconductor part is located being located on the side of the film layer where the inorganic transistor is located away from the substrate, the film layer where the organic semiconductor part is located being located on the side of a film layer where the photoelectric sensor element is located away from the substrate, the organic transistor of the detection unit being connected to a sensing electrode, the sensing electrode being located on the side of the film layer where the inorganic transistor is located away from the substrate.

20 Claims, 24 Drawing Sheets

DETECTION SUBSTRATE AND DETECTION CIRCUIT

CROSS-REFERENCE TO RELATED APPLICATIONS

This application claims priority to Chinese Patent Application No. CN202211249325.4, filed on Oct. 12, 2022, the entire content of which is incorporated herein by reference.

TECHNICAL FIELD

The present disclosure relates to the field of detection technology and, more specifically, to a detection substrate and a detection circuit.

BACKGROUND

In recent years, the technology of microfluidic chips has developed rapidly, and its application in medicine, life science, and other fields has been continuously expanded. Microfluidic chip refers to the use of microfabrication technology to integrate the microchannel network structure and other functional elements on a substrate of several square centimeters, and control the fluid in the microchannel by controlling the fluid in the microchannel to realize a micro-total analysis system having various functions such as sample injection, dilution, mixing, reaction, separation, detection, etc. with advantages such as miniaturization, integration, fast analysis speed, and low reagent consumption. For example, the conventional on-site rapid nucleic acid detection system based on electrochemical detection method mainly uses a biomolecular microarray chip, and its principle is to fix a series of addressable recognition molecules on the surface of the substrate, and realize the conversion of biological signals to electrical signals through the number of hydrogen ions shed during nucleic acid amplification.

In order to adapt to the needs of multiple samples, rapid detection, and reduction of manual operations, various automated microfluidic detectors have been introduced in related art. While these automated microfluidic detectors can reduce manual operations to free up labor, and eliminate subjective errors in testing. Since the conventional biomolecular microarray chips generally separate the reaction from the detection, the detection substrate only realizes the concentration detection function of the solution reaction, and there is no detection component for the fluorescence reaction, such that the detection function of the fluorescence reaction cannot be realized. In this way, expensive and complex fluorescence detection devices for the detection of fluorescence reaction still needs to be used, and simultaneous detection of binoculuses and fluorescence reaction in fluids cannot be realized, which fails to fundamentally realize the various needs of a rapid detection.

Therefore, there is a need for a detection substrate and a detection circuit that can not only realize the sensing of biological reactions in fluid, but also integrate the fluorescence reaction detection function to realize the integration of biological reaction detection and fluorescence reaction detection.

SUMMARY

One aspect of the present disclosure provides a detection substrate. The detection substrate includes a substrate and a plurality of detection units disposed on a side of the substrate. Each detection unit includes at least an inorganic transistor, an organic transistor, and a photoelectric sensor element. The organic transistor includes an organic semiconductor part. In a direction perpendicular to a plane of the substrate, a film layer where the organic semiconductor part is located is located on the side of the film layer where the inorganic transistor is located away from the substrate, and the film layer where the organic semiconductor part is located is located on the side of a film layer where the photoelectric sensor element is located away from the substrate. The organic transistor of the detection unit is connected to a sensing electrode, and the sensing electrode is located on the side of the film layer where the inorganic transistor is located away from the substrate.

Another aspect of the present disclosure provides a detection circuit. The detection circuit includes a plurality of detection unit. Each detection unit includes a first detection module, a second detection module, and a reading module that are electrically connected. The first detection module and the second detection module are both connected to the reading module. The first detection module includes an organic transistor and a sensing electrode. A gate of the organic transistor is electrically connected to the sensing electrode. The second detection module includes a photoelectric sensor element.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Figure 1:
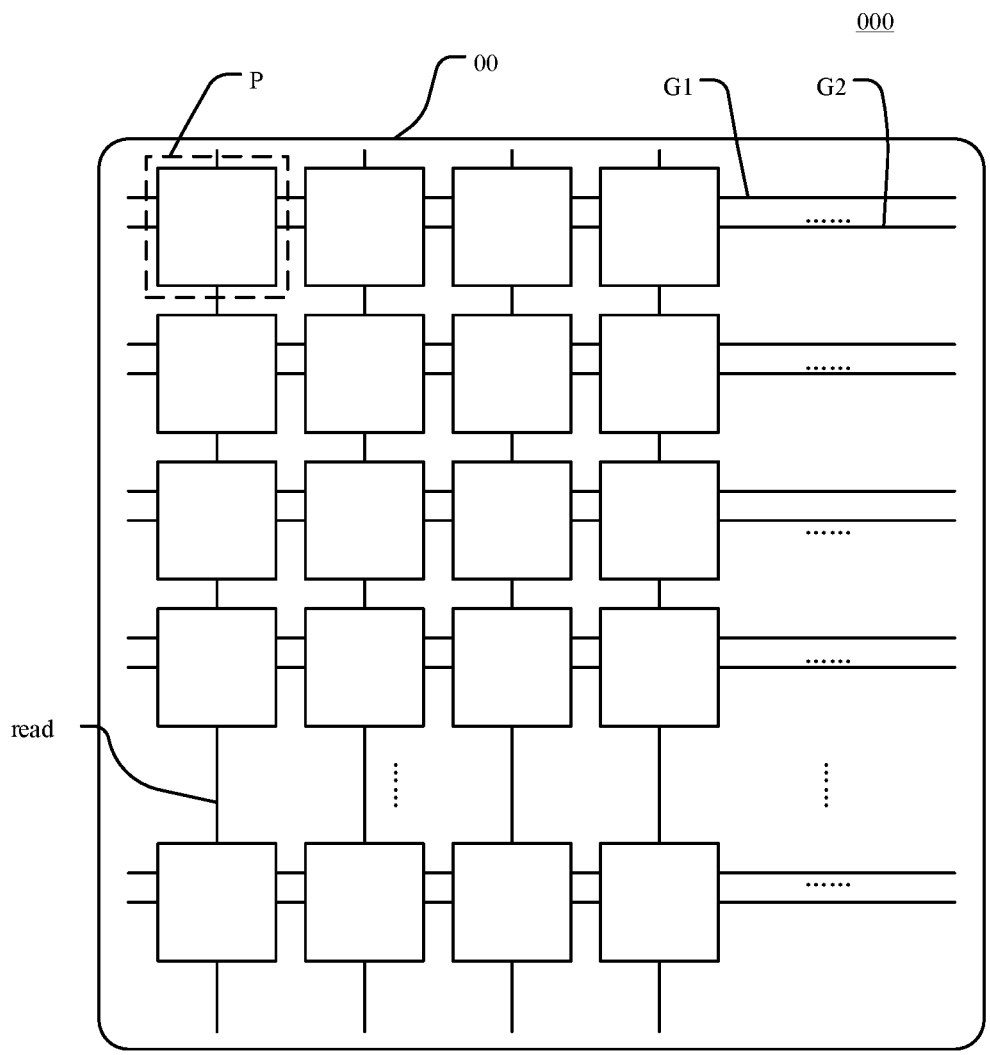
FIG. 1 is a schematic plan structural diagram of a detection substrate according to an embodiment of the present disclosure.

Various exemplary embodiments of the present disclosure are described in detail with reference to the drawings. It should be noted that relative arrangement of components and steps, numerical expressions and values clarified in the embodiments are not intended to limit the scope of the present disclosure, unless otherwise specified.

The following description of the at least one exemplary embodiment is merely illustrative and shall not be constructed as any limitation on the present disclosure and its application or use.

Techniques, methods and apparatus known to those skilled in the art may not be discussed in detail, but the techniques, methods and apparatus should be considered as a part of the specification where appropriate.

In all of the examples shown and discussed herein, any specific values are to be construed as illustrative only rather than limitation. Thus, different values may be used in other examples of the exemplary embodiments.

It should be noted that similar reference numerals and letters indicate similar items in the following drawings. Therefore, once an item is defined in one drawing, the item is unnecessary to be further discussed in subsequent drawings.

Figure 2:
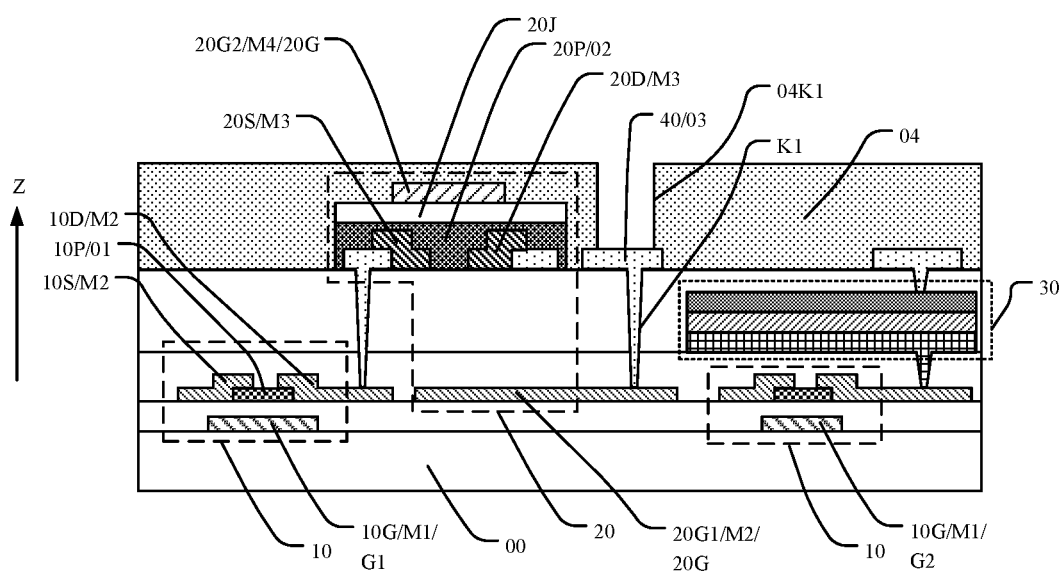
FIG. 2 is a schematic cross-sectional structural diagram of a detection unit of the detection substrate shown in FIG. 1.

Refer to FIG. 1 and FIG. 2. FIG. 1 is a schematic plan structural diagram of a detection substrate according to an embodiment of the present disclosure, and FIG. 2 is a schematic cross-sectional structural diagram of a detection unit of the detection substrate shown in FIG. 1. In this embodiment, a detection substrate 000 includes a substrate 00 and a plurality of detection units P located on one side of the substrate. The detection unit P may include at least an inorganic transistor 10, an organic transistor 20, and a photoelectric sensor element 30. The organic transistor 20 may include at least an organic semiconductor part 20P. In a direction Z perpendicular to the plane where the substrate 00 is located, a film layer where the organic semiconductor part 20P is located may be located on the side away from the substrate 00 of the film layer where the inorganic transistor 10 is located, and the film layer where the organic semiconductor part 20P is located may be located on the side away from the substrate 00 of the film layer where the photoelectric sensor element 30 is located. The organic transistor 20 of the detection unit P may be connected to a sensing electrode 40, and the sensing electrode 40 may be located on the side of the film layer where the inorganic transistor 10 is located away from the substrate 00.

More specifically, the detection substrate 000 provided in this embodiment includes the substrate 00 and a plurality of detection units P located on one side of the substrate 00. In some embodiments, a plurality of detection units P may be arranged in an array on one side of the substrate 00 (as shown in FIG. 1), however, the arrangement of the plurality of detection units P are not limited thereto. In this embodiment, the detection unit P at least includes an inorganic transistor 10 and an organic transistor 20, and the organic transistor 20 is connected to the sensing electrode 40. The inorganic transistor 10 may be used as a switch tube for the detection unit P to start detection due to its small leakage current, while the organic transistor 20 may be used as a sensing element for biomolecules due to its large sub-threshold swing and large leakage current. In this embodiment, the organic transistor 20 of the detection unit P is connected to the sensing electrode 40. The sensing electrode 40 may be a biomolecule or ion-sensitive electrode, and ions in the to-be-detected solution can be easily absorbed to the surface of the sensing electrode 40, thereby changing the potential of the sensing electrode 40. Therefore, the organic transistor 20 and the sensing electrode 40 connected to the organic transistor 20 in this embodiment can be used for the detection unit P to detect biomolecules. It should be understood that the electrical connection between the organic transistor 20 and the sensing electrode 40 is not limited in the embodiments of the present disclosure. For example, the organic transistor 20 may have a double-gate structure, and one gate of the organic transistor 20 may be connected to the sensing electrode 40, such that the sensing electrode 40 can be exposed to the to-be-detected solution and be in contact with the to-be-detected solution to absorb the ionic or molecular structures to be detected in the solution. The other gate of the organic transistor 20 may be used to control the organic transistor 20 to operate in the sub-threshold range, thereby ensuring the conduction operation of the organic transistor 20, which is not limited in the embodiments of the present disclosure. In this embodiment, the detection unit P at least further includes a photoelectric sensor element 30, and the photoelectric sensor element 30 may be configured to realize the detection function of the fluorescence reaction under the action of the switch tube of the inorganic transistor 10. In some embodiments, the photoelectric sensor element 30 may be any photoelectric sensor element capable of sensing and identifying the light signal and converting the light signal into an electrical signal, such as a photosensitive diode, which is not limited in the embodiments of the present disclosure.

In some embodiments, the detection substrate 000 may include a plurality of signal lines for providing driving signals to each detection unit P, such as a plurality of first scan lines G1 shown in FIG. 1, a plurality of second scan lines G2 shown in FIG. 1 and FIG. 2, and a plurality of detection signal lines (not shown in FIG. 2). The first scan line G1 may be connected to the gate of the inorganic transistor 10 connected to the organic transistor 20 in the detection unit P in the same row. For example, the first scan line G1 may be connected to a gate 10G of the inorganic transistor 10 in FIG. 2 to control the conduction between the inorganic transistor 10 and the organic transistor 20 connected to the inorganic transistor 10, and realize the ion solubility detection of biological reactions through the sensing electrode 40 connected to the organic transistor 20. The second scan line G2 may be connected to gate of the organic transistor 20 connected to the photoelectric sensor element 30 in the detection unit P in the same row. For example, the second scan line G2 may be connected to the gate 10G of another inorganic transistor 10 in FIG. 2 to control the conduction between the inorganic transistor 10 and the photoelectric sensor element 30 to realize fluorescence detection. The detection signal line read may be respectively connected with the organic transistor 20 and the photoelectric sensor element 30 of the detection unit P in the same column. In ion solubility detection, the detection result may be output through the detection signal line read, and in the fluorescence detection, the detection result may be output through the detection signal line read. It should be understood that, the signal lines included on the detection substrate 000 shown in FIG. 1 is an example. During specific implementations, the type and quantity of signal lines arranged on the substrate can include but are not limited to the example shown in FIG. 1, and can be set based on actual design requirements.

The basic structure and functions of the organic transistor (or organic thin-film transistor, OTFT) 20 of the present disclosure are substantially the same as the conventional inorganic transistor with the difference being an organic semiconductor is used as the working substance in the manufacturing process of the organic transistor. The semiconductor material of the inorganic transistor 10 of the present disclosure may be inorganic silicon, while the organic transistor 20 of the present disclosure may be made of organic semiconductor material. Compared with the conventional inorganic transistors of amorphous silicon or polysilicon, the organic transistor 20 has the characteristics of low process temperature, generally below 120° C., and low cost.

In this embodiment, in the direction Z perpendicular to the plane where the substrate 00 is located, the film layer where the organic semiconductor part 20P is located may be located on the side away from the substrate 00 of the film layer where the inorganic transistor 10 is located, and the film layer where the organic semiconductor part 20P is located may be located on the side away from the substrate 00 of the film layer where the photoelectric sensor element 30 is located. That is, the film layer where the organic semiconductor part 20P is located may be located on the side of the film layer of the inorganic transistor 10 and the film layer of the photoelectric sensor element away from the substrate 00. It should be understood that, the embodiments of the present disclosure do not limit the positional relationship between the film layer where the inorganic transistor 10 is located and the film layer where the photoelectric sensor element 30 is located, which can be set based on the specific structure of the photoelectric sensor element 30. The embodiment shown in FIG. 2 takes the film layer where the inorganic transistor 10 is located being on the side of the film layer where the photoelectric sensor element 30 is located close to the substrate 00 as an example for illustration. However, during specific implementations, as long as the film layer where the organic semiconductor part 20P is located is on the side of the film layer where the inorganic transistor 10 is located away from the substrate 00, and the film layer where the organic semiconductor part 20P is located is on the side of the film layer where the photoelectric sensor element 30 is located away from the substrate 00 are satisfied, the positional relationship between the film layer where the inorganic transistor 10 is located and the film layer where the photoelectric sensor element 30 is located can be considered a met. During the manufacturing process of the detection substrate 000, the film layer structure of the organic transistor 20 needs to be fabricated after the film layer structures of the inorganic transistor 10 and the photoelectric sensor element 30 are fabricated on the substrate 00. Since the inorganic transistor 10 and the photoelectric sensor element 30 are generally fabricated by a high temperature process (the maximum temperature of the process can reach 340° C.-360° C.), the organic semiconductor part 20P of the organic transistor 20 may only be fabricated by a low temperature process (the process temperature is generally below 120° C.). If the film layer structure of the organic semiconductor part 20P of the organic transistor 20 is arranged under the film layer where the inorganic transistor 10 is located and the film layer where the photoelectric sensor element 30 is located, when the inorganic transistor 10 is fabricated by a high temperature process, the high temperature of the inorganic transistor 10 will affect the performance of the organic transistor 20, such that the performance of the organic transistor 20 will deteriorate or even fail. In the detection substrate 000 provided in the embodiments of the present disclosure, each detection unit P can not only realize the sensing of biological reactions in the fluid through the organic transistor 20 and the sensing electrode 40 connected to the organic transistor 20, but also realize the fluorescence reaction detection function of the substrate through the photoelectric sensor element 30. That is, the detection substrate 000 provided by the embodiments of the present disclosure can realize the integration of biological reaction detection and fluorescence detection. In addition, by arranging the film layer where the organic semiconductor part 20P is located to be on side of the film layer where the inorganic transistor 10 is located and the film layer where the photoelectric sensor element 30 is located away from the substrate 00, the film layers of different structures in the detection unit P can also be reasonably arranged. In this way, after the film layer structures of the inorganic transistor 10 and the photoelectric sensor element 30 of the high temperature process are fabricated on the substrate 00, the film layer structure of the organic semiconductor part 20P of the organic transistor 20 of the low temperature process can be fabricated, which avoids the performance failure of the organic semiconductor part 20P of the organic transistor 20 caused by the high temperature, which is beneficial to the integration of biological reaction detection and fluorescence detection to achieve diversified detection functions on the same substrate, thereby improving the detection efficiency of the detection substrate 000, and ensuring the product yield of the detection substrate 000 and the accuracy of the detection results.

It should be understood that the embodiments of the present disclosure do not specifically limit the fabrication process of the inorganic transistor 10 and the organic transistor 20. In some embodiments, the film layer structure of the inorganic transistor 10 may be fabricated by the chemical vapor deposition (CVD) process technology or the physical vapor deposition (PVD) process technology. The film layer structure of the organic transistor 20 may be fabricated by spin coating (for example, a plurality of protrusions parallel to each other may be formed on the organic semiconductor part of the organic transistor 20 on the surface to be coated, and the spin coating process can be applied in a predetermined direction) and photolithography after the inorganic transistor 10 and the photoelectric sensor element 30 are fabricated on the substrate 00. However, the film layer structure of the organic transistor 20 may also be fabricated by other process technology, which is not limited in the embodiments of the present disclosure. The structures of the inorganic transistor 10 and the organic transistor 20 are not described in detail in this embodiment. The inorganic transistor 10 may include a gate electrode 10G, a source electrode 10S, a drain electrode 10D, an inorganic semiconductor part 10P, etc. The organic transistor 20 may include a gate electrode 20G, a source electrode 20S, a drain electrode 20D, an organic semiconductor part 20P, etc. An organic insulating layer 20J may be used to insulate between the conductive layers of the organic transistor 20, which is not limited in the embodiments of the present disclosure.

It should be understood that the number of inorganic transistors 10 disposed in each detection unit P of the detection substrate 000 is not limited in the embodiments of the present disclosure. During specific implementations, the number of the inorganic transistors 10 may be set based on the structure to be controlled by the inorganic transistors 10 used as switch tubes. In some embodiments, the inorganic transistor 10 may also be used as a transistor for realizing other functions in the detection unit P, such as an amplifying transistor, which is not limited in the embodiments of the present disclosure, as long as when the detection unit P includes the inorganic transistor 10 and the organic transistor 20, the film layer where the organic semiconductor part 20P is located is located on the side of the film layer where the inorganic transistor 10 is located away from the substrate 00. In some embodiments, as shown in FIG. 2, the detection unit P may include at least two inorganic transistors 10. One of the inorganic transistors 10 may be connected to the organic transistor 20, and configured to control the sensing electrode 40 connected to the organic transistor 20 to realize the sensing of biomolecules or ion signals in the to-be-detected solution. The other inorganic transistors 10 may be connected to the photoelectric sensor element 30 for controlling the photoelectric sensor element 30 to realize fluorescence reaction detection. During specific implementations, the inorganic transistor 10 included in the detection unit P may include, but is not limited to, the arrangement described above.

It should be understood that the embodiments of the present disclosure do not specifically limit the type of the photoelectric sensor element 30 in each detection unit P of the detection substrate 000. FIG. 2 takes the photoelectric sensor element 30 as a PIN-type photodiode as an example for illustration. During specific implementations, the photoelectric sensor element 30 may be set as a photosensitive diode or other photosensitive element based on the requirements of photosensitive detection, as long as when the detection unit P includes the photoelectric sensor element 30 and the organic transistor 20, the film layer where the organic semiconductor part 20P is located is located on the side of the film layer where the photoelectric sensor element 30 is located away from the substrate 00.

It should be noted that detection substrate 000 provided by the embodiments of the present disclosure is not limited to the structure described above. During specific implementations, the detection substrate 000 may also include other structures. For example, the substrate 00 of the detection substrate 000 may further include signal lines for providing driving signals to each detection unit P, and the substrate 00 of the detection substrate 000 may further include the circuit structure for outputting and analyzing the detection signal, which are not described in detail in the present disclosure.

In some embodiments, as shown in FIG. 1 and FIG. 2, the organic transistor 20 included in the detection unit P may be a double-gate organic transistor, which includes a first gate 20G1 and a second gate 20G2. The film layer where the first gate 20G1 is located may be located on the side of the film layer where the second gate 20G2 is located facing the substrate 00, and the first gate 20G1 may be connected to the sensing electrode 40.

In some embodiments, the organic transistor 20 included in the detection unit P may have a double-gate structure. That is, the organic transistor 20 may include the first gate 20G1 and the second gate 20G2. The film layer where the first gate 20G1 is located may be located on the side of the film layer where the second gate 20G2 is located facing the substrate 00. The second gate 20G2 can be understood as the top gate of the organic transistor 20 with a double-gate structure, and the first gate 20G1 can be understood as the bottom gate of the organic transistor 20 with the double-gate structure. The first gate 20G1 may be connected to the sensing electrode 40. In some embodiments, when the film layer where the first gate 20G1 is located and the film layer where the sensing electrode 40 is located are disposed in different layers, the first gate 20G1 and the sensing electrode 40 may be connected through a via hole (as shown in FIG. 2). In this embodiment, by setting the organic transistor 20 of the detection unit P as a double-gate organic transistor, the second gate 20G2 of the top gate can be used to control the organic transistor 20 to work in the sub-threshold region, such that the organic transistor 20 can be turned on, and the first gate 20G1 of the bottom gate can be connected to the sensing electrode 40. In this way, the film layer where the sensing electrode 40 is located can be located at a relatively upper position of the detection substrate 000, such that the sensing electrode 40 can be in contact with the to-be-detected solution. When the detection substrate 000 detects the concentration of biomolecules or ions, the sensing electrode 40 can be a biomolecule or ion-sensitive electrode, and ions in the to-be-detected solution can be easily absorbed to the surface of the sensing electrode 40, thereby changing the potential of the sensing electrode 40. At this time, the voltage of the first gate 20G1 of the bottom gate will change accordingly, which in turn causes the change of the threshold voltage of the organic transistor 20, thereby causing the output current through the organic transistor 20 to change. In this way, the sensing of biomolecule or ion signals in the to-be-detected solution can be realized by changing the electrical signal to the output of the detection unit P. In this embodiment, when the detection substrate 000 performs fluorescence reaction detection, the photoelectric sensor element 30 can be turned on with the output of the detection unit P through the switch of the inorganic transistor 10 in the detection unit P. In this way, the detection function of the fluorescence reaction can be realized by outputting the optical signal sensed by the photoelectric sensor element 30 in the form of an electrical signal.

In this embodiment, the organic transistor 20 of the detection unit P is a double-gate organic transistor. The second gate 20G2 of the top gate can be used to control the organic transistor 20 to work in the sub-threshold region, such that the organic transistor 20 is turned on to work. In this way, the second gate 20G2 of the organic transistor 20 of each detection unit P on the detection substrate 000 can be connected together (not shown in the accompanying drawings), and the same signal line can be used to control the second gates 20G2 to work in the sub-threshold region to ensure conduction of the organic transistors 20 in the detection units P, which is beneficial to reducing the number of signal lines on the substrate.

Figure 3:
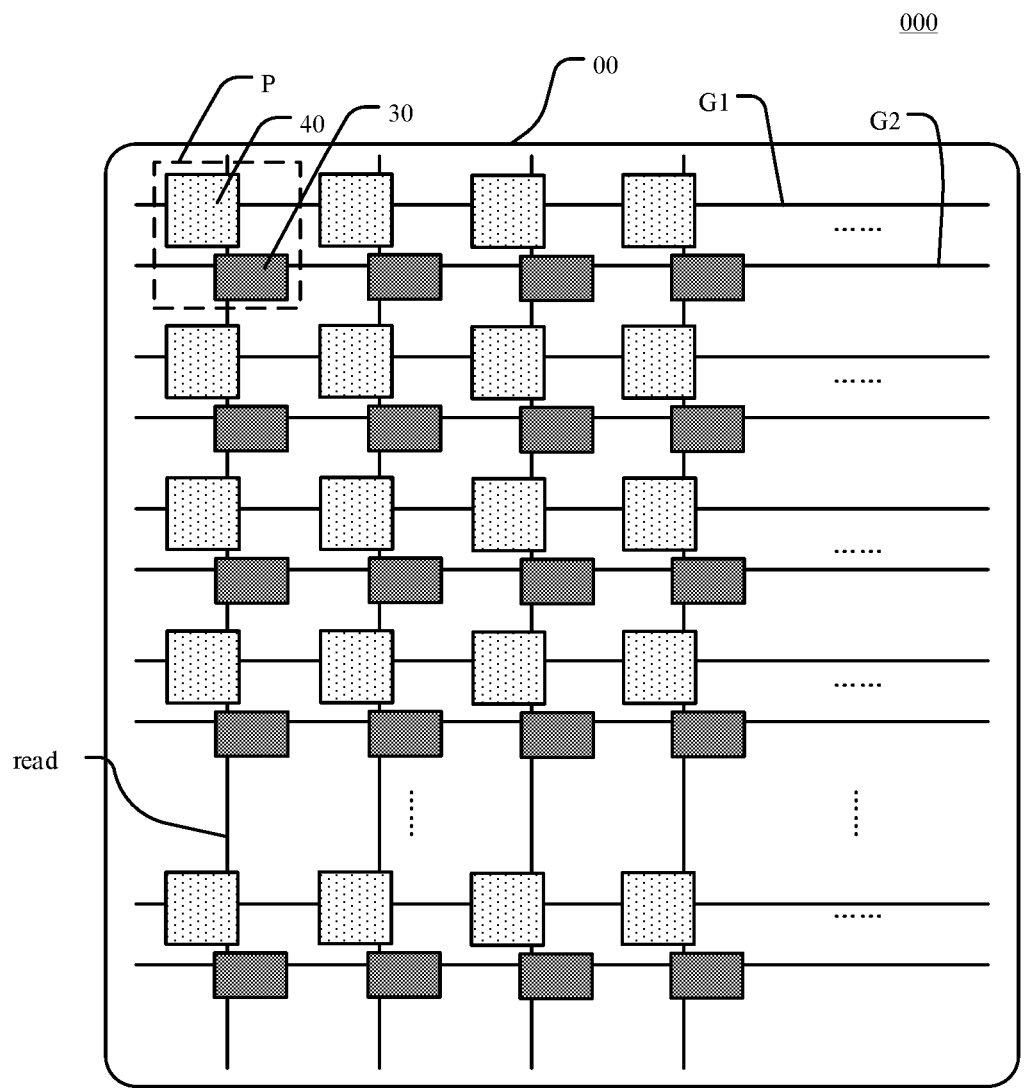
FIG. 3 is another schematic plan structural diagram of the detection substrate according to an embodiment of the present disclosure.

FIG. 3 is another schematic plan structural diagram of the detection substrate according to an embodiment of the present disclosure. Refer to FIG. 2 and FIG. 3, in some embodiments, in the direction Z perpendicular to the pane where the substrate 00 is located, the organic transistor 20 may not overlap with the photoelectric sensor element 30.

In some embodiments, in the detection substrate 000, when the structure of the detection unit P is fabricated on the side of the substrate 00, the film layer where the organic semiconductor part 20P is located may be located on the side where the film layer where inorganic transistor 10 is located and the film layer where the photoelectric sensor element 30 is located away from the substrate 00. In this way, the performance failure of the fabricated organic transistor 20 due to high temperature can be avoided, and the accuracy of the detection results can be ensured. The organic transistor 20 and the photoelectric sensor element 30 can be arranged to not overlap each other in the direction Z perpendicular to the plane where the substrate 00 is located. That is, although the film layer structure of organic transistor 20 may be located on the side of the film layer where the photoelectric sensor element 30 is located away from the substrate 00, the film layer structure of organic transistor 20 can prevent the organic transistor 20 from being arranged directly above the photoelectric sensor element 30, thereby preventing the organic transistor 20 from affecting the photosensitive detection capability of the photoelectric sensor element 30, which is beneficial to ensuring the photoelectric detection performance of the detection substrate 000.

Refer to FIG. 1 and FIG. 2, in some embodiments, the detection substrate 000 may include a first metal layer M1, a first active layer 01, a second metal layer M2, a first electrode layer 03, a third metal layer M3, a second active layer 02, and a fourth metal layer M4 on one side of the substrate 00. The gate electrode 10G of the inorganic transistor 10 may be located in the first metal layer M1, an active part 10P of the inorganic transistor 10 may be located in the first active layer 01, and a source electrode 10S and a drain electrode 10D of the inorganic transistor 10 may be located in the second metal layer M2. The sensing electrode 40 may be located in the first electrode layer 03, and the sensing electrode 40 may be connected to the first gate 20G1 of the organic transistor 20 through a first via K1. A source electrode 20S and a drain electrode 20D of the organic transistor 20 may be located in the third metal layer M3, an active part 20P of the organic transistor 20 may be located in the second active layer 02, and the second gate 20G2 of the organic transistor 20 may be located in the fourth metal layer M4.

Figure 4:
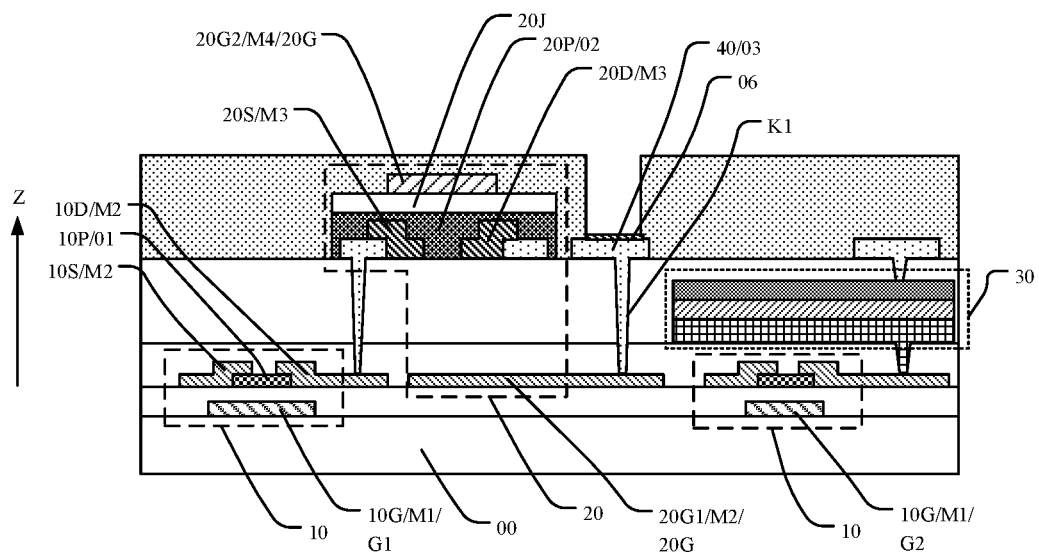
FIG. 4 is another schematic cross-sectional structural diagram of the detection unit of the detection substrate shown in FIG. 1.

In this embodiment, the film layer structure of the detection substrate 000 on one side of the substrate 00 may include a plurality of metal conductive layers, transparent conductive layers, and semiconductor layers to fabricate the organic transistor 20, the inorganic transistor 10, and the photoelectric sensor element 30 of the detection unit P. It should be understood that an insulating layer (not shown in the accompanying drawings) may be arranged between the different conductive layers for insulation. More specifically, one side of the substrate 00 of the detection substrate 000 may at least include the first metal layer M1, the first active layer 01, the second metal layer M2, the first electrode layer 03, the third metal layer M3, the second active layer 02, and fourth metal layer M4, and each metal layer may use different metal materials based on the required structure. That is, the fabrication materials of different metal layers may be the same or different. The active part 10P of the inorganic transistor 10 may be located in the first active layer 01. The first active layer 01 may be used to fabricate the active part 10P of the inorganic transistor 10, and the first active layer 01 may be a semiconductor material such as inorganic silicon. The active part 20P of the organic transistor 20 may be located in the second active layer 02. The second active layer 02 may be used to fabricate the active part 20P of the organic transistor 20, and the second active layer 02 may be made of organic semiconductor materials. The first electrode layer 03 may be used to fabricate the sensing electrode 40. The sensing electrode 40 may be connected to the first gate 20G1 of the organic transistor 20 through the first via K1, such that the first gate 20G1 of the organic transistor 20 can be connected to the sensing electrode 40. The first electrode layer 03 may be a transparent conductive material, such as indium tin oxide (ITO) semiconductor transparent conductive material, which is not limited in the embodiments of the present disclosure. The gate electrode 10G of the inorganic transistor 10 may be located in the first metal layer M1, the active part 10P of the inorganic transistor 10 may be located in the first active layer 01, and the source electrode 10S and drain electrode 10D of the inorganic transistor 10 may be located in the second metal layer M2. The fabrication material of the first metal layer M1 may be metal molybdenum or other materials, and the fabrication material of the second metal layer M2 may be composite metal materials such as titanium aluminum titanium, which is not limited in the embodiments of the present disclosure, and can be understood with reference to the structure of an inorganic thin-film transistor in the related art. The source electrode 20S and drain electrode 20D of the organic transistor 20 may be located in the third metal layer M3, and the second gate 20G2 of the organic transistor 20 may be located in the fourth metal layer M4. FIG. 4 is another schematic cross-sectional structural diagram of the detection unit of the detection substrate shown in FIG. 1. In some embodiments, as shown in FIG. 4, the third metal layer M3 and the fourth metal layer M4 may be made of gold (Au). By using gold (Au) to fabricate the source electrode 20S and the drain electrode 20D of the organic transistor 20 and the second gate 20G2 of the organic transistor 20, the gold of the third metal layer M3 or the fourth metal layer M4 may be reused to modify the surface of the sensing electrode 40 with biomolecular probes. As shown in FIG. 4, a modified part 06 located above the sensing electrode 40 may be fabricated by reusing the third metal layer M3, such that no additional modification layer is needed to modify the surface of the sensing electrode 40, which is beneficial to reducing the thickness of the substrate. If the surface of the sensing electrode 40 exposed to the to-be-detected solution is not modified with biomolecular probes, the sensing electrode 40 is substantially a pure conductive structure without the capability to identify specific ions or biomolecules. The surface of the sensing electrode 40 modified by the biomolecular probes has the adsorption function of specific ions or biomolecules, such that the sensing of specific ions or biomolecules can be realized. That is, the gold of the third metal layer M3 or the fourth metal layer M4 can be reused to modify the surface of the sensing electrode 40 with biomolecular probes, and the sensing electrode 40 can be a superimposed structure of a transparent conductive structure with biomolecular probes after the modification, which is beneficial to ensuring the sensing effect of the sensing electrode 40 on specific ions or biomolecules.

Refer to FIG. 1 and FIG. 2. In some embodiments, the film layer where the photoelectric sensor element 30 is located may be located on the side of the film layer where the inorganic transistor 10 is located away from the substrate 00, and the film layer where the organic semiconductor part 20P is located may be located on the side of the film layer where the photoelectric sensor element 30 is located away from the substrate 00.

In some embodiments, in the detection substrate 000, when the structure of the detection unit P is fabricated on the side of the substrate 00, the film layer where the organic semiconductor part 20P is located may be located on the side where the film layer where inorganic transistor 10 is located and the film layer where the photoelectric sensor element 30 is located away from the substrate 00. In this way, the performance failure of the fabricated organic transistor 20 due to high temperature can be avoided, and the accuracy of the detection results can be ensured. The film layer where the photoelectric sensor element 30 is located may be arranged to be on the side of the film layer where the inorganic transistor 10 is located away from the substrate 00, and the film layer where the organic semiconductor part 20P is located may be arranged to be on the side of the film layer where the photoelectric sensor element 30 is located away from the substrate 00. That is, the organic transistor 20 in the same detection unit P may be located on the side of the film layer where the photoelectric sensor element 30 is located away from the substrate 00. In this way, the organic transistor 20 fabricated by the low temperature process can be fabricated last to avoid high temperature failure, and at the same time, the film layer where the photoelectric sensor element 30 is located can be as close to the top of the detection substrate 000 as possible. In this way, the number of layers of the insulating layer above the photoelectric sensor element 30 can be reduced, and the light can be sensed by the photoelectric sensor element 30 as much as possible, which is beneficial to improving the photosensitivity of the photoelectric sensor element 30.

It should be understood that the embodiment of FIG. 2 showing the film layer where the organic semiconductor part 20P is located is located on the side of the film layer where the photoelectric sensor element 30 is located away from the substrate 00 only takes the organic transistor 20 and the photoelectric sensor element 30 not overlapping each other in the direction of Z perpendicular to the plane where the substrate 00 is located as an example. During specific implementations, the film layer where the organic semiconductor part 20P is located may be located on the side of the film layer where the photoelectric sensor element 30 is located away from the substrate 00. Further, the organic transistor 20 and the photoelectric sensor element 30 may also be partially overlapped in the direction Z perpendicular to the plane where the substrate 00 is located, as along as the film layer where the organic semiconductor part 20P is located can be located at the top of the detection substrate 000 as much as possible to prevent the organic transistor 20 fabricated by the low temperature process from being affected by high temperature and fail, and the photosensitivity performance of the photoelectric sensor element 30 can be ensured at the same time.

Figure 5:
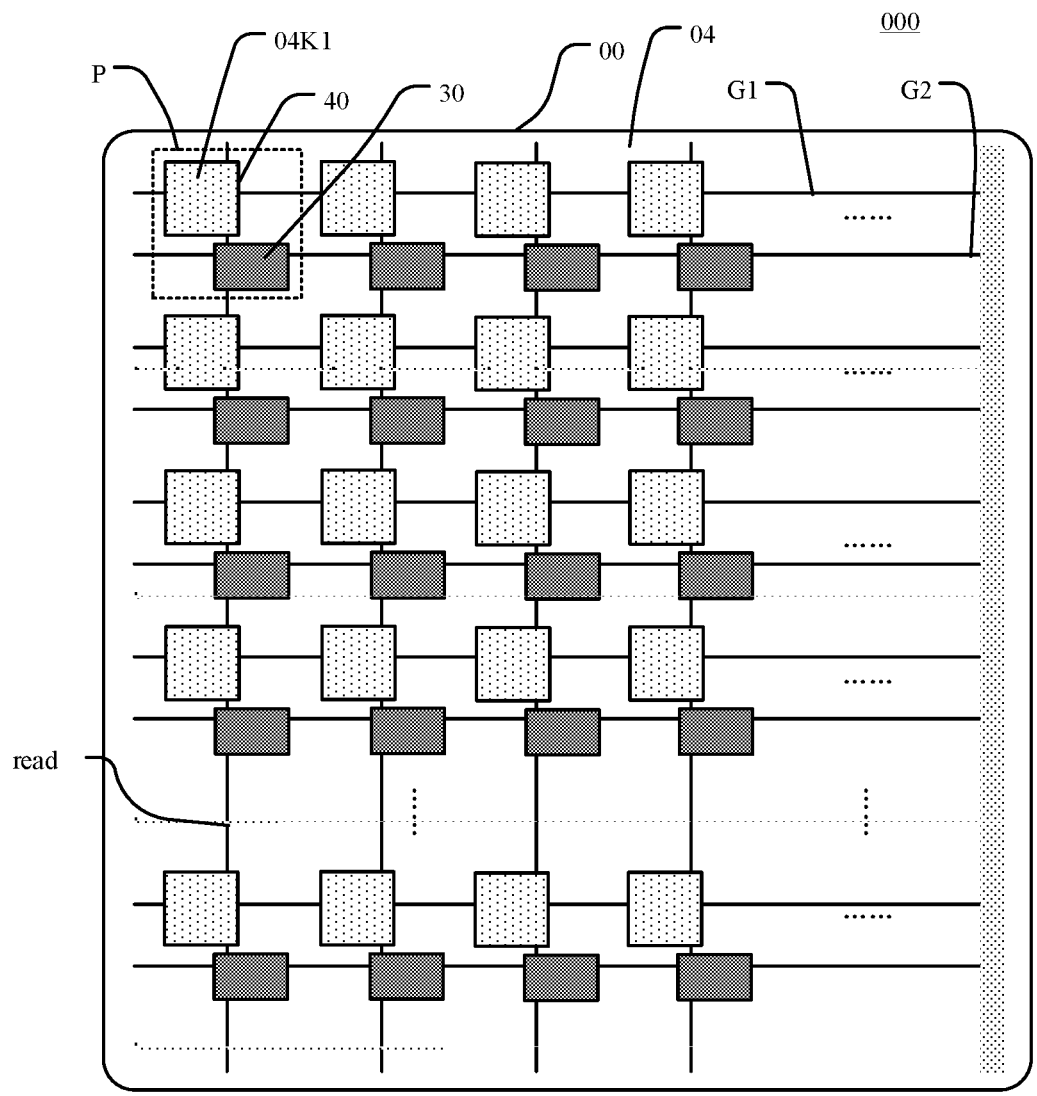
FIG. 5 is another schematic plan structural diagram of the detection substrate according to an embodiment of the present disclosure.

FIG. 5 is another schematic plan structural diagram of the detection substrate according to an embodiment of the present disclosure (it should be understood that in order to clearly illustrate the structure of this embodiment, FIG. 5 is filled with transparency). Refer to FIG. 2 and FIG. 5. In some embodiments, the detection substrate 000 may further include a first protective layer 04. The first protective layer 04 may be located on the side of the film layer where the organic transistor 20 is located away from the substrate 00, and the first protective layer 04 may include a first via 04K1. The first via 04K1 may penetrate at least part of the first protective layer 04, and at least part of the sensing electrode 40 may be exposed through the first via 04K1.

In some embodiments, the detection substrate 000 may further include a first protective layer 04 located on the side of the film layer where the organic transistor 20 is located away from the substrate 00. The first protective layer 04 may be made of insulating materials with good light transmittance, such as silicon nitride, to cover the film layer where the organic transistor 20 is located to protect the structure of the organic transistor 20 of each detection unit P, and to avoid affecting the photosensitive performance of the photoelectric sensor element 30. In some embodiments, the first protective layer 04 may include a first via 04K1. The first via 04K1 may penetrate at least part of the first protective layer 04, and at least part of the sensing electrode 40 may be exposed through the first via 04K1. In this way, the first protective layer 04 can protect the structure of the organic transistor 20, and exposed the sensing electrode 40 through the first via 04K1 at the same time, such that when the detection substrate 000 detects the solubility of biomolecules or ions, the sensing electrode 40 can be in contact with the to-be-detected solution to absorb the biomolecules or ions in the to-be-detected solution, thereby realizing the detection function of ions or biomolecules.

It should be noted that the embodiments of the present disclosure do not specifically limit the shape of the orthographic project of the first via 04K1 on the plane where the substrate 00 is located. The shape of the first via 04K1 may be a circle, a square, or other shapes, as along the first via 04K1 can expose at least part of the sensing electrode 40. During specific implementations, the shape of the first via 04K1 can be designed based on needs.

Figure 6:
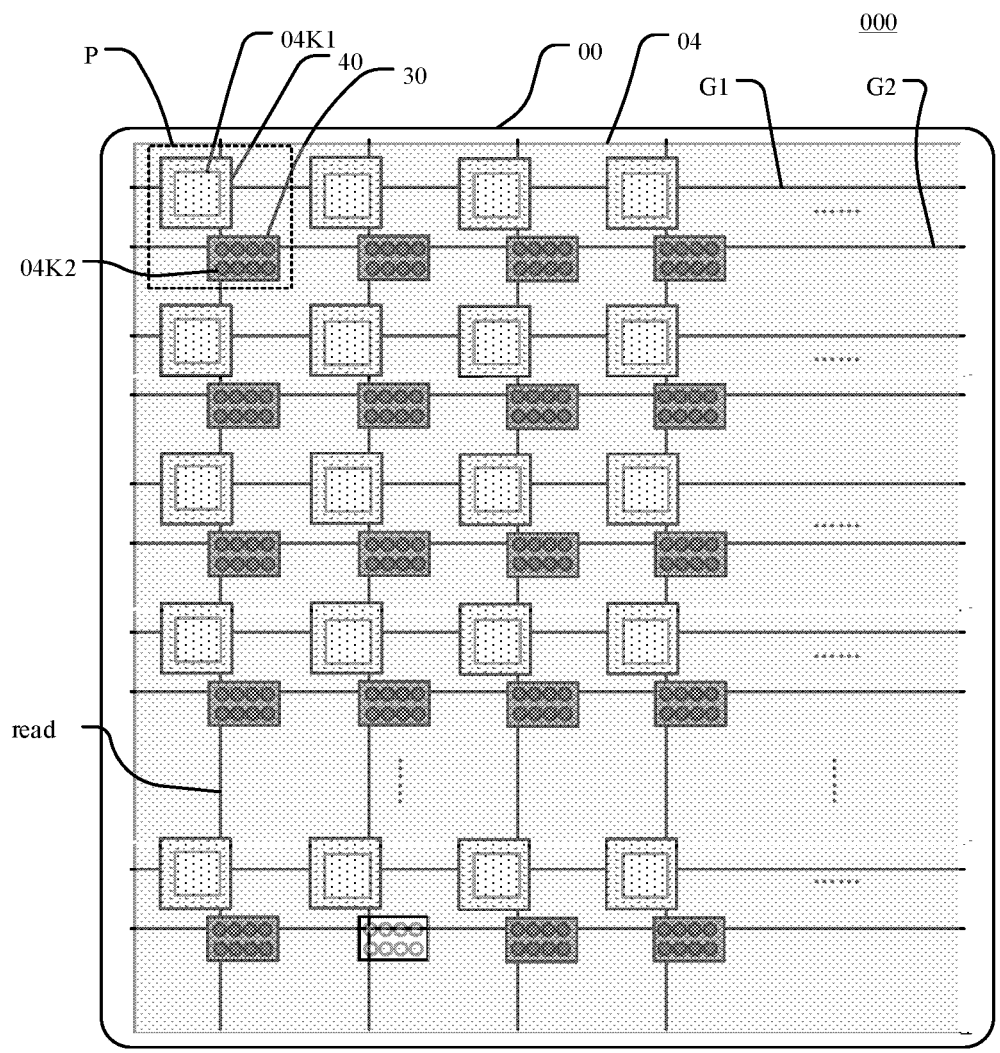
FIG. 6 is another schematic plan structural diagram of the detection substrate according to an embodiment of the present disclosure.
Figure 7:
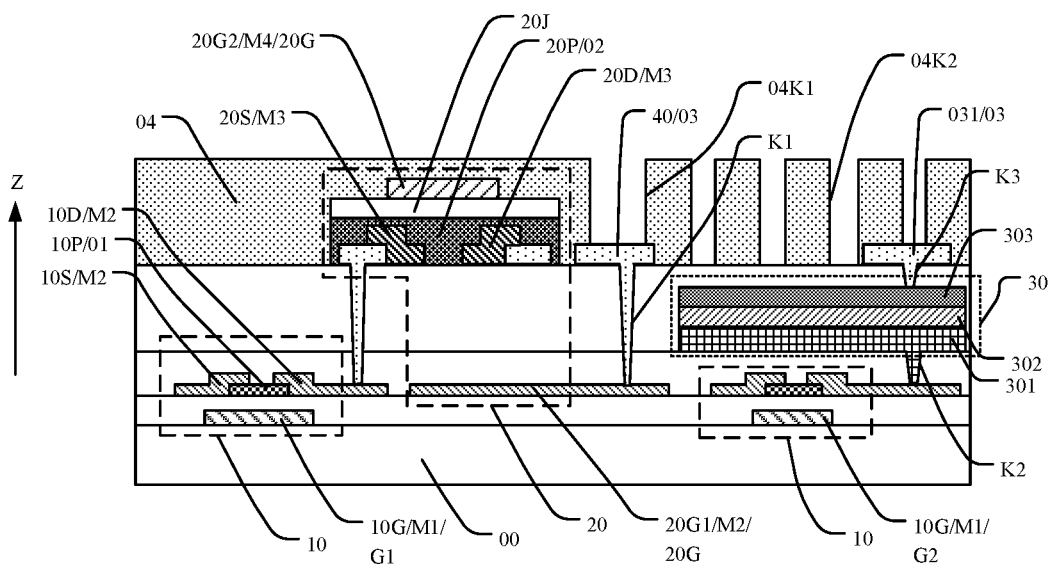
FIG. 7 is a schematic cross-sectional structural diagram of the detection unit of the detection substrate shown in FIG. 6.

FIG. 6 is another schematic plan structural diagram of the detection substrate according to an embodiment of the present disclosure, and FIG. 7 is a schematic cross-sectional structural diagram of the detection unit of the detection substrate shown in FIG. 6 (it should be understood that in order to clearly illustrate the structure of this embodiment, FIG. 6 is filled with transparency). Refer to FIG. 6 and FIG. 7. In some embodiments, the first protective layer 04 may further include a plurality of second vias 04K2, and the second vias 04K2 may penetrate at least part of the first protective layer 04. In addition, in the direction Z perpendicular to the plane where the substrate 00 is located, the second vias 04K2 may at least partially overlap the photoelectric sensor element 30.

In some embodiments, when the detection substrate 000 includes the first protective layer 04 located on the side of the film layer where the organic transistor 20 is located away from the substrate 00 to cover the film layer where the organic transistor 20 is located to protect the structure of the organic transistor 20 of each detection unit P, a plurality of second vias 04K2 may be disposed in the first protective layer 04. The second vias 04K2 may penetrate at least part of the first protective layer 04, or the second vias 04K2 may penetrate through the thickness of the first protective layer 04. In addition, in the direction Z perpendicular to the plane where the substrate 00 is located, the second vias 04K2 may at least partially overlap with the photoelectric sensor element 30. That is, the plurality of second vias 04K2 disposed in the first protective layer 04 may be located within the range where the photoelectric sensor element 30 is located. In some embodiments, the plurality of second vias 04K2 may be arranged above the same photoelectric sensor element 30 in an array, such that the transmittance of light at the position of the photoelectric sensor element 30 can be improved, which is beneficial to ensuring the photosensitive detection performance of the detection substrate 000.

It should be noted that the embodiments of the present disclosure do not specifically limit the shape of the orthographic project of the second via 04K2 on the plane where the substrate 00 is located. The shape of the second via 04K2 may be a circle, a square, or other shapes. In FIG. 6, the second via 04K2 is circular and the first via 04K1 exposing at least part of the sensing electrode 40 is square as an example for illustration. During specific implementations, the shape of the first via 04K1 can be designed based on needs.

Figure 8:
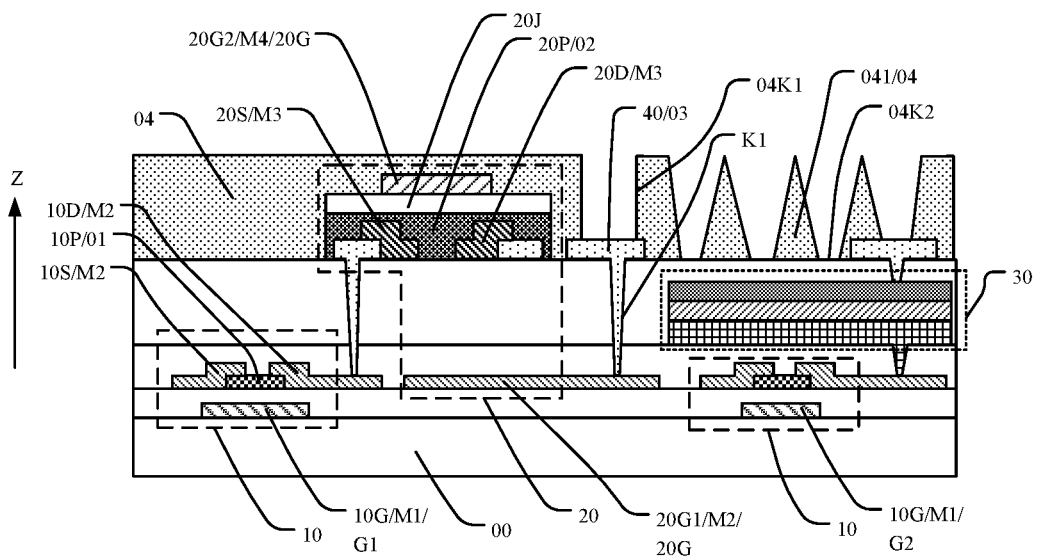
FIG. 8 is another schematic cross-sectional structural diagram of the detection unit of the detection substrate shown in FIG. 6.
Figure 9:
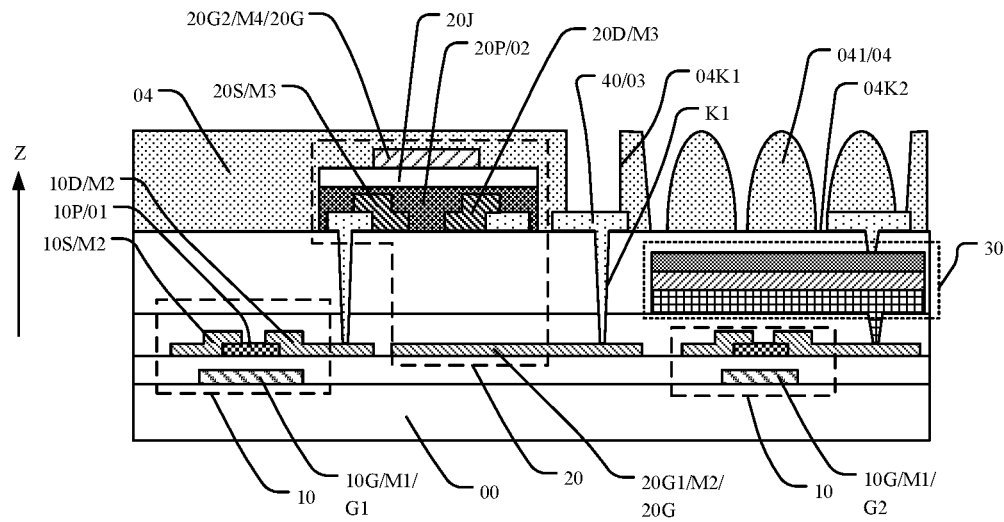
FIG. 9 is another schematic cross-sectional structural diagram of the detection unit of the detection substrate shown in FIG. 6.

FIG. 8 is another schematic cross-sectional structural diagram of the detection unit of the detection substrate shown in FIG. 6, and FIG. 9 is another schematic cross-sectional structural diagram of the detection unit of the detection substrate shown in FIG. 6. Refer to FIG. 6, FIG. 8, and FIG. 9. In some embodiments, the first protective layer 04 may include a plurality of microprism structures 041, and in the direction Z perpendicular to the plane where the substrate 00 is located, the microprism structures 041 may at least partially overlap with the photoelectric sensor element 30.

In some embodiments, the first protective layer 04 disposed on the side of the film layer where the organic transistor 20 is located away from the substrate 00 may include a plurality of microprism structures 041, and in the direction Z perpendicular to the plane where the substrate 00 is located, the microprism structures 041 may be arranged to at least partially overlap with the photoelectric sensor element 30. In some embodiments, the microprism structures 041 may include any one of the triangular microprism structures shown in FIG. 8 or the semicircular microprism structures shown in FIG. 9, which is not limited in the embodiments of the present disclosure, as long as the shape of the microprism structures 041 can condense light. In this embodiment, by disposing a plurality of second vias 04K2 in an array above the same photoelectric sensor element 30 to form a plurality of microprism structures 041, the to-be-sensed light can be collected through the microprism structures 041 to the area where the photoelectric sensor element 30 is located, which is beneficial to improving the photosensitive detection performance of the detection substrate 000.

Refer to FIG. 1, FIG. 2, FIG. 6, and FIG. 7. In some embodiments, the first gate 20G1 of the organic transistor 20 may be located in the second metal layer M2.

In some embodiments, the organic transistor 20 included in the detection unit P may be configured as a double-gate structure. That is, the organic transistor 20 may include a first gate 20G1 and a second gate 20G2. The second gate 20G2 of the top gate may be used to control the organic transistor 20 to work in the sub-threshold region, such that the organic transistor 20 can be turned on, and the first gate 20G1 of the bottom gate may be connected to the sensing electrode 40. In this way, the film layer where the sensing electrode 40 is located can be located at a relatively upper position of the detection substrate 000, such that the sensing electrode 40 can be in contact with the to-be-detected solution. The potential of the sensing electrode may change, and the voltage of the first gate 20G1 of the bottom gate may also change accordingly, such that the threshold voltage of the organic transistor 20 may change. When realizing the sensing of biomolecule or ion signals in the to-be-detected solution, since the first gate 20G1 of the organic transistor 20 can be located on the side of the second gate 20G2 facing the substrate 00, therefore, the first gate 20G1 of the organic transistor 20 may be fabricated by reusing any conductive metal layer under the film layer where the source electrode 20S and the drain electrode 20D of the organic transistor 20 are located. Among the plurality of metal conductive layers between the third metal layer M3 where the source electrode 20S and the drain electrode 20D of the organic transistor 20 are located and the substrate 00, the second metal layer M2 is the metal layer closest to the active part 20P of the organic transistor 20. Therefore, in some embodiments, the first gate 20G1 of the organic transistor 20 may be arranged to be in the second metal layer M2, and the second metal layer M2 where the source electrode 10S and the drain electrode 10D of the inorganic transistor 10 are located may be reused to form the first gate 20G1 of the organic transistor 20. In this way, there is no need to provide a metal film layer on the substrate 00 to form the bottom gate of the organic transistor 20, which is beneficial to improving the fabrication efficiency of the substrate and reducing the overall thickness of the substrate.

Refer to FIG. 6 and FIG. 7. In some embodiments, the photoelectric sensor element 30 may include a N-type semiconductor part 301, an intrinsic semiconductor part 302, and a P-type semiconductor part 303 that are arranged in a stack. In the direction Z perpendicular to the plane of the substrate 00, the intrinsic semiconductor part 302 may be located between the N-type semiconductor part 301 and the P-type semiconductor part 303. Further, the N-type semiconductor part 301 may be connected to the drain electrode 10D of the at least one inorganic transistor 10 through the second via K2.

In some embodiments, the photoelectric sensor element 30 included in each detection unit P on the detection substrate 000 may be a PIN-type photodiode. The photoelectric sensor element 30 may include the stacked N-type semiconductor part 301, the intrinsic semiconductor part 302, and the P-type semiconductor part 303 that are arranged in a stack. A layer of intrinsic semiconductor part 302 may be sandwiched between the P-type semiconductor part 303 and the stacked N-type semiconductor part 301. When the photoelectric sensor element 30 of this structure performs photosensitive detection, most of the incident light can be absorbed in the intrinsic semiconductor part 302 and a large number of electron-hole pairs can be generated. Photocurrent can be generated by absorbing light radiation to realize photosensitive detection. The PIN-type photodiode has the advantages of small junction capacitance, fast response speed, and high sensitivity, which can improve the photosensitive detection capability of the detection unit P.

Refer to FIG. 6 and FIG. 7. In some embodiments, the first electrode layer 03 on the substrate 00 may include a bias voltage line 031, and the bias voltage line 031 may be connected to the P-type semiconductor part 303 through a third via K3. When the photoelectric sensor element 30 is a PIN-type photodiode, the PIN-type photodiode needs to apply a bias voltage to perform the photosensitive detection work, and the bias voltage can be supplied through a plurality of bias voltage lines 031 arranged in the detection substrate 000. In some embodiments, the bias voltage line 031 may be routed from the outer periphery of the detection unit P to the driving module, and the bias voltage may be supplied to the bias voltage line 031 through the driving module and transmitted to the photoelectric sensor element 30. The first electrode layer 03 may be located on the side of the film layer where the photoelectric sensor element 30 is located away from the substrate 00, such that the first electrode layer 03 can be used to fabricate the sensing electrode 40 of each detection unit P, and fabricate the bias voltage line 031 connected to the photoelectric sensor element 30 of each detection unit P at the same time, which is beneficial to ensuring the normal operation of the photoelectric sensor element 30 and reducing the overall thickness of the substrate.

Figure 10:
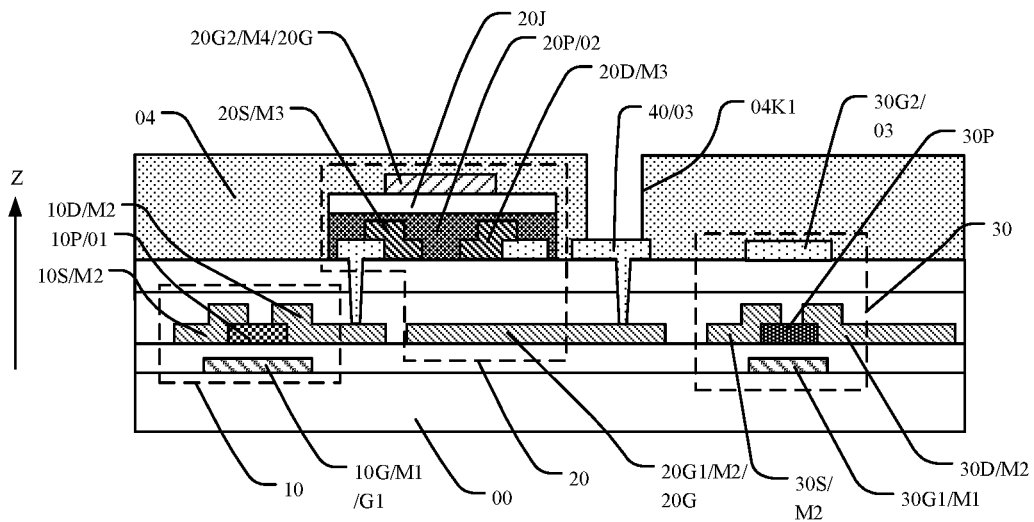
FIG. 10 is a schematic cross-sectional structural diagram of the detection unit of the detection substrate shown in FIG. 5.

FIG. 10 is a schematic cross-sectional structural diagram of the detection unit of the detection substrate shown in FIG. 5. Refer to FIG. 5 and FIG. 10. In some embodiments, at least part of the film layer where the photoelectric sensor element 30 is located may be arranged to be in the same layer as at least part of the film layer where the inorganic transistor 10 is located.

In some embodiments, in the fabrication process of the detection substrate 000, in order to protect the organic transistor 20 fabricated by the low temperature process, both the film layer where the inorganic transistor 10 is located and the film layer where photoelectric sensor element 30 is located fabricated by the high temperature process may need to be fabricated on the side of the substrate 00 first. Therefore, at least part of the film layer where the photoelectric sensor element 30 is located may be arranged to be in the same layer as at least part of the film layer where the inorganic transistor 10 is located. In some embodiments, when the photoelectric sensor element 30 has a photosensitive transistor structure, the film layer of part of the photoelectric sensor element 30 of the photosensitive transistor structure may be arranged in the same layer as at least part of the film layer of the inorganic transistor 10. Further, at least part of the film layer of the inorganic transistor 10 may be reused to fabricate part of the film layer of the photoelectric sensor element 30, which can reduce the number of film layers on the detection substrate 000 and is beneficial to reducing the thickness of the substrate.

In some embodiments, the photoelectric sensor element 30 of each detection unit P in the detection substrate 000 may include a photosensitive transistor. The photosensitive transistor may include a third gate 30G1 and a fourth gate 30G2. The film layer where the third gate 30G1 is located may be located on the side of the film layer where the fourth gate 30G2 is located facing the substrate 00.

In some embodiments, the photoelectric sensor element 30 used by each detection unit P in the detection substrate 000 for photosensitive detection may have a photosensitive transistor structure. The photosensitive transistor may be a photosensitive transistor with a double-gate structure. That is, the photosensitive transistor may include a third gate 30G1 and a fourth gate 30G2. At this time, the third gate 30G1 can be understood as the bottom gate of the photosensitive transistor, and the fourth gate 30G2 can be understood as the top gate of the photosensitive transistor. The film layer where the third gate 30G1 is located may be located on the side of the film layer where the fourth gate 30G2 is located facing the substrate 00. The third gate 30G1 of the photosensitive transistor, the source electrode 30S of the photosensitive transistor, and the drain electrode 30D of the photosensitive transistor may be arranged in the same layer as the film layer structure of the inorganic transistor 10, which reduces the number of layers on the detection substrate 000, which is beneficial to reducing the thickness of the substrate. In some embodiments, when the material of the active part 10P of the inorganic transistor 10 has strong light absorption capability, the active part 10P of the inorganic transistor 10 and the active part 30P of the photosensitive transistor may also be arranged in the same layer to ensure the light absorption sensing capability of the photosensitive transistor. Alternatively, the active part 10P of the inorganic transistor 10 and the active part 30P of the photosensitive transistor may also be arranged in different layers, which is not limited in the embodiments of the present disclosure. In some embodiments, the fourth gate 30G2 serving as the top gate of the photosensitive transistor may be fabricated with the first electrode layer 03 to ensure that the fourth gate 30G2 of the top gate has better light transmittance. In this way, the active part 30P of the photosensitive transistor can receive as much light as possible to ensure the photosensitive detection effect of the photoelectric sensor element 30.

Figure 11:
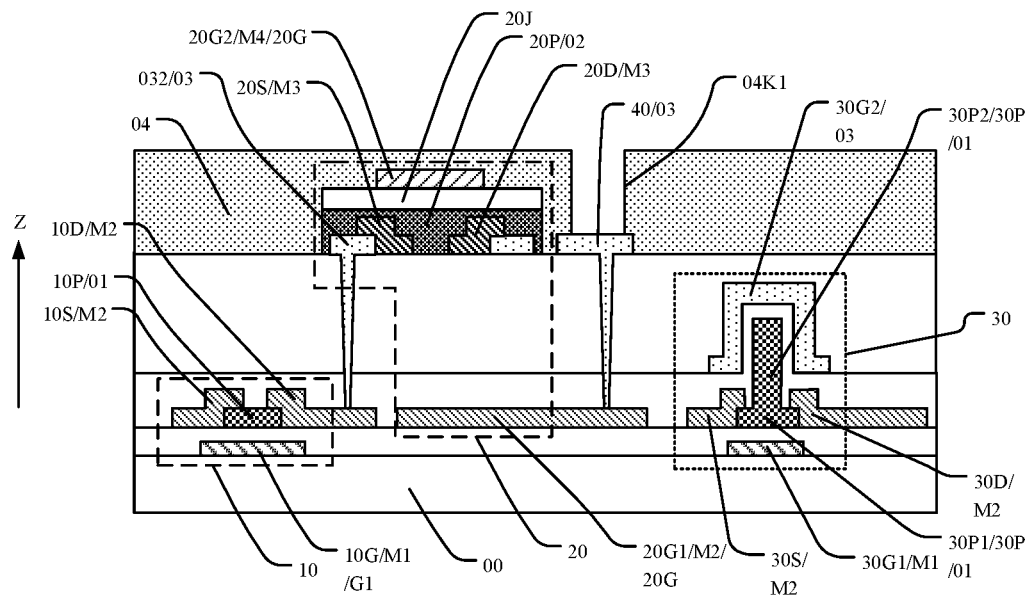
FIG. 11 is another schematic cross-sectional structural diagram of the detection unit of the detection substrate shown in FIG. 5.

FIG. 11 is another schematic cross-sectional structural diagram of the detection unit of the detection substrate shown in FIG. 5. Refer to FIG. 5 and FIG. 11. In some embodiments, the photosensitive transistor serving as the photoelectric sensor element 30 may be a fin gate transistor, and the fourth gate 30G2 may have a fin gate structure. The active part 30P of the fin gate transistor may include a first body 30P1 and a first bump 30P2 located on the side of the first body 30P1 away from the substrate 00.

In some embodiments, in each of the detection unit P of the detection substrate 000, the photosensitive transistor used as the photoelectric sensor element 30 may be a fin gate transistor, and the top gate of the photosensitive transistor, that is, the fourth gate 30G2 may have a fin gate structure. The fin gate structure may be formed by the active part 30P of the fin gate transistor including the first body 30P1 and the first bump 30P2. The active part 30P of the fin gate transistor may include the first body 30P1 having a planar structure and the first bump 30P2 located on the side of the first body 30P1 away from the substrate 00, such that the surface of the active part 30P of the fin gate transistor facing away from the substrate 00 can protrude in a direction away from the substrate 00, thereby forming the fin gate structure when the fourth gate 30G2 of the top gate is formed. In this embodiment, the photosensitive transistor used as the photoelectric sensor element 30 may be a fin gate transistor. Compared with the overall planar structure of the active part 30P of the photosensitive transistor, the active part 30P of the photosensitive transistor can have the first bump 30P2, that is, the area for receiving light can be greatly increased. In this way, the light absorption capability of the photoelectric sensor element 30 can be greatly enhanced with this structure to realize high-sensitivity optical signal sensing.

As shown in FIG. 5 and FIG. 11, in some embodiments, when the photosensitive transistor serving as the photoelectric sensor element 30 is a fin gate transistor, the third gate 30G1 of the fin gate transistor may be located in the first metal layer M1, and the active part 30P of the fin gate transistor may be located in the first active layer 01. The source electrode 30S and the drain electrode 30D of the fin gate transistor may be located in the second metal layer M2. The fourth gate 30G2 of the fin gate transistor may be located on the first electrode layer 03, and the orthographic projection of the fourth gate 30G2 of the fin gate transistor on the plane where the substrate 00 is located may cover the orthographic projection of the first bump 30P2 on the plane where the substrate 00 is located. In this way, part of the film layer of the photosensitive transistor used as the photoelectric sensor element 30 and part of the film layer of the inorganic transistor 10 can be arranged in the same layer, and the third gate 30G1 of the fin gate transistor can be located in the first metal layer M1, which is on the same layer as the gate electrode 10G of the inorganic transistor 10. The active part 30P of the fin gate transistor may be located in the first active layer 01. If the fabrication material of the active part 10P of the inorganic transistor 10 is a semiconductor material with strong light absorption capability, the active part 30P of the fin gate transistor and the active part 10P of the inorganic transistor 10 can be arranged in the same layer and located in the first active layer 01. The source electrode 30S and the drain electrode 30D of the fin gate transistor may be located in the second metal layer M2, and arranged in the same layer as the source electrode 10S and the drain electrode 10D of the inorganic transistor 10. The fourth gate 30G2 of the fin gate transistor may be located in the first electrode layer 03 and arranged in the same layer as the sensing electrode 40, which is beneficial to reducing the number of film layers on the detection substrate 000 and realizing the thin design of the substrate. In this embodiment, the orthographic projection of the fourth gate 30G2 of the fin gate transistor on the plane where the substrate 00 is located can be arranged to cover the orthographic projection of the first bump 30P2 on the plane where the substrate 00 is located. With the structure of the first bump 30P2 of the active part 30P of the fin gate transistor, the second gate 20G2 of the photosensitive transistor can have a fin gate structure, thereby achieving better photosensitive detection performance.

In some embodiments, the fabrication material of the first active layer 01 on the substrate 00 side of the detection substrate 000 may include an amorphous silicon material. That is, the inorganic transistor 10 may be an amorphous silicon transistor, and the active part 10P of the inorganic transistor 10 may be an amorphous silicon (a-Si) material. At this time, the active part 30P of the photosensitive transistor serving as the photoelectric sensor element 30 may be arranged in the same layer as the active part 10P of the inorganic transistor 10. Amorphous silicon has a stronger light absorption capability, which allows the active part 30P of the photosensitive transistor made of the first active layer 01 of amorphous silicon material to have stronger light absorption capability, thereby realizing the light sensing capability of the photoelectric sensor element 30. In this embodiment, the photosensitive transistor serving as the photoelectric sensor element 30 can be further set as a fin gate transistor. In this way, the active part 30P of the amorphous silicon material of the photosensitive transistor can have the first bump 30P2, and the area for receiving light can be greatly increased. In this way, the light absorption capability of the photoelectric sensor element 30 can be greatly enhanced with this structure to realize high-sensitivity optical signal sensing.

Figure 12:
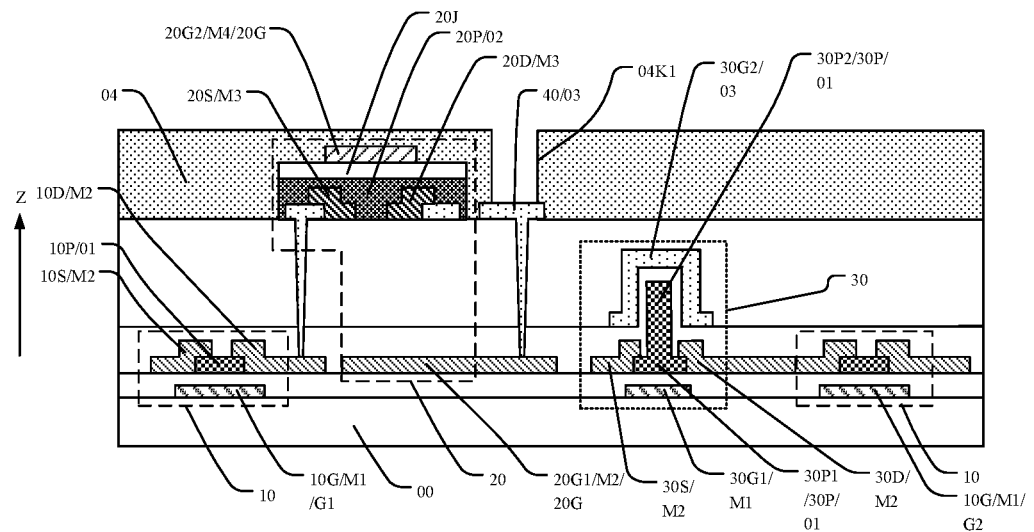
FIG. 12 is another schematic cross-sectional structural diagram of the detection unit of the detection substrate shown in FIG. 5.

FIG. 12 is another schematic cross-sectional structural diagram of the detection unit of the detection substrate shown in FIG. 5. It should be understood that, as shown in FIG. 12, each detection unit P may include at least two inorganic transistors 10. One of the inorganic transistors 10 may be connected to the organic transistor 20 (as shown in the cross-sectional view of FIG. 12), and configured to control the organic transistor 20 and the sensing electrode 40 connected thereto to realize biosensing detection. The other inorganic transistor 10 may be connected to the photosensitive transistor serving as the photoelectric sensor element 30. When the source electrode 10S and the drain electrode 10D of the inorganic transistor 10 are arranged in the same layer as the source electrode 30S and the drain electrode 30D of the photosensitive transistor, the connection between the inorganic transistor 10 and the photosensitive transistor may connect the source electrode 10S of the inorganic transistor 10 and the drain electrode 30D of the photosensitive transistor together to use the inorganic transistor 10 as the switch tube for sensing the light intensity of a photosensitive transistor. However, the present disclosure is not limited hereto.

Figure 13:
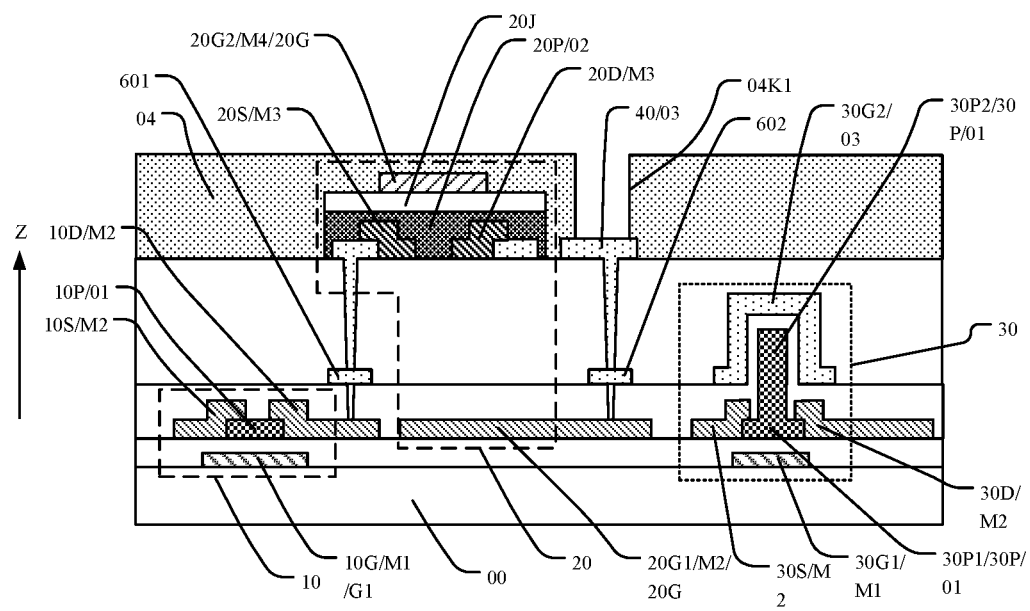
FIG. 13 is another schematic cross-sectional structural diagram of the detection unit of the detection substrate shown in FIG. 5.

FIG. 13 is another schematic cross-sectional structural diagram of the detection unit of the detection substrate shown in FIG. 5. Refer to FIG. 5 and FIG. 13. In some embodiments, when the drain electrode 10D of the inorganic transistor 10 is connected to the source electrode 20S of the organic transistor 20, in order to avoid the disconnection when the drain electrode 10D of the inorganic transistor 10 and the source electrode 20S of the organic transistor 20 in different layers are connected through the via, a first pad layer 601 may be added between the drain electrode 10D of the inorganic transistor 10 and the source electrode 20S of the organic transistor 20. The first pad layer 601 may be made of the same material as the first electrode layer 03, thereby avoiding the disconnection between the drain electrode 10D of the inorganic transistor 10 and the source electrode 20S of the organic transistor 20 of different layers due to process fluctuations and errors during production, thereby improving the production yield of the substrate. Similarly, in order to avoid the disconnection when the sensing electrode 40 and the first gate 20G1 of the bottom gate of the organic transistor 20 of different layers are connected through the via, a second pad layer 602 may be added between the sensing electrode 40 and the first gate 20G1 of the bottom gate of the organic transistor 20. The second pad layer 602 may be made of the same material as the first electrode layer 03, thereby avoiding the disconnection between the sensing electrode 40 and the first gate 20G1 of the organic transistor 20 of different layers due to process fluctuations and errors during production, thereby improving the production yield of the substrate.

Figure 14:
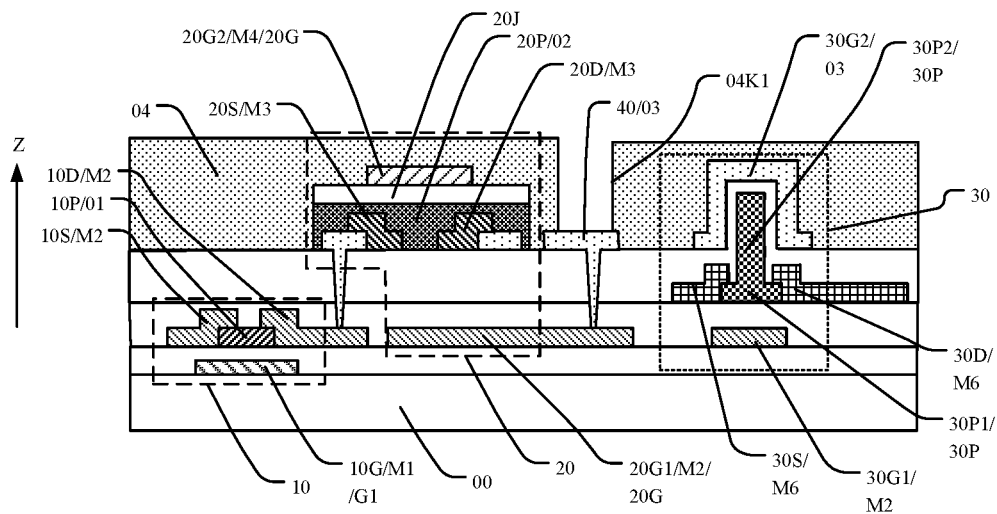
FIG. 14 is another schematic cross-sectional structural diagram of the detection unit of the detection substrate shown in FIG. 5.

FIG. 14 is another schematic cross-sectional structural diagram of the detection unit of the detection substrate shown in FIG. 5. Refer to FIG. 5 and FIG. 14. In some embodiments, the fabrication material of the first active layer 01 may include metal oxide, and the third gate 30G1 of the photosensitive transistor serving as the photoelectric sensor element 30 may be located in the second metal layer M2; the active part 30P of the photosensitive transistor may include amorphous silicon material, and the film layer where the active part 30P of the photosensitive transistor is located may be located on the side of the second metal layer M2 away from the substrate 00; and the film layer where the source electrode 30S and the drain electrode 30D of the photosensitive transistor are located may be located on the side of the film layer where the active part 30P of the photosensitive transistor is located away from the substrate 00.

In some embodiments, the fabrication material of the first active layer 01 may include a metal oxide material. That is, the inorganic transistor 10 may be a metal oxide transistor, and the active part 10P of the inorganic transistor 10 may be made of a metal oxide material (such as indium gallium zinc oxide, IGZO). In this embodiment, the inorganic transistor 10 in the detection substrate 000 is set as a metal oxide transistor which, when compared with the amorphous silicon transistor, can effectively reduce the leakage current of the inorganic transistor 10, thereby improving the overall detection effect of the substrate.

At this time, in order to ensure the photosensitive performance of the photosensitive transistor serving as the photoelectric sensor element 30, the active part 30P of the photosensitive transistor may still need to be made of amorphous silicon material. That is, the film layer where the active part 30P of the photosensitive transistor is located may be arranged in a different layer from the first active layer 01. The film layer where the active part 30P of the photosensitive transistor is located may be arranged on the side of the second metal layer M2 away from the substrate 00, and the film layer where the source electrode 30S and the drain electrode 30D of the photosensitive transistor are located may be separately arranged on the side of the film layer where the active part 30P of the photosensitive transistor is located away from the substrate 00. As shown in FIG. 14, the sixth metal layer M6 located between the first electrode layer 03 and the second metal layer M2 may be used to fabricate the source electrode 30S and the drain electrode 30D of the photosensitive transistor. In this embodiment, the third gate 30G1 of the bottom gate of the photosensitive transistor can be made by reusing the second metal layer M2, that is arranged in the same layer as the source electrode 10S and the drain electrode 10D of the inorganic transistor 10 to reduce the number of film layers in the substrate.

Figure 15:
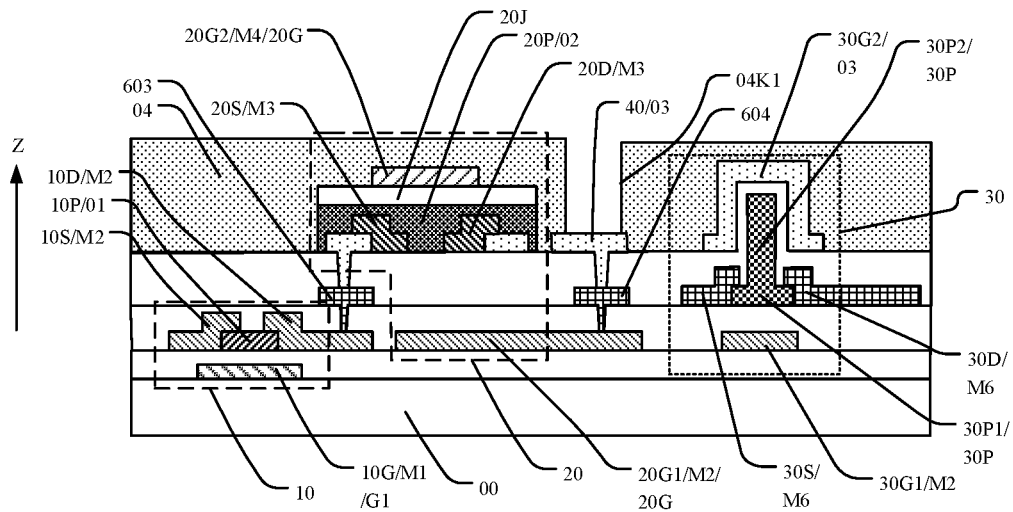
FIG. 15 is another schematic cross-sectional structural diagram of the detection unit of the detection substrate shown in FIG. 5.

FIG. 15 is another schematic cross-sectional structural diagram of the detection unit of the detection substrate shown in FIG. 5. Refer to FIG. 5 and FIG. 15. In some embodiments, when the drain electrode 10D of the inorganic transistor 10 is connected to the source electrode 20S of the organic transistor 20, in order to avoid the disconnection when the drain electrode 10D of the inorganic transistor 10 and the source electrode 20S of the organic transistor 20 in different layers are connected through the via, a third pad layer 603 may be added between the drain electrode 10D of the inorganic transistor 10 and the source electrode 20S of the organic transistor 20. The third pad layer 603 may be made of the same material as the sixth metal layer M6, thereby avoiding the disconnection between the drain electrode 10D of the inorganic transistor 10 and the source electrode 20S of the organic transistor 20 of different layers due to process fluctuations and errors during production, thereby improving the production yield of the substrate. Similarly, in order to avoid the disconnection when the sensing electrode 40 and the first gate 20G1 of the bottom gate of the organic transistor 20 of different layers are connected through the via, a fourth pad layer 604 may be added between the sensing electrode 40 and the first gate 20G1 of the bottom gate of the organic transistor 20. The fourth pad layer 604 may be made of the same material as the sixth metal layer M6, thereby avoiding the disconnection between the sensing electrode 40 and the first gate 20G1 of the organic transistor 20 of different layers due to process fluctuations and errors during production, thereby improving the production yield of the substrate.

Figure 16:
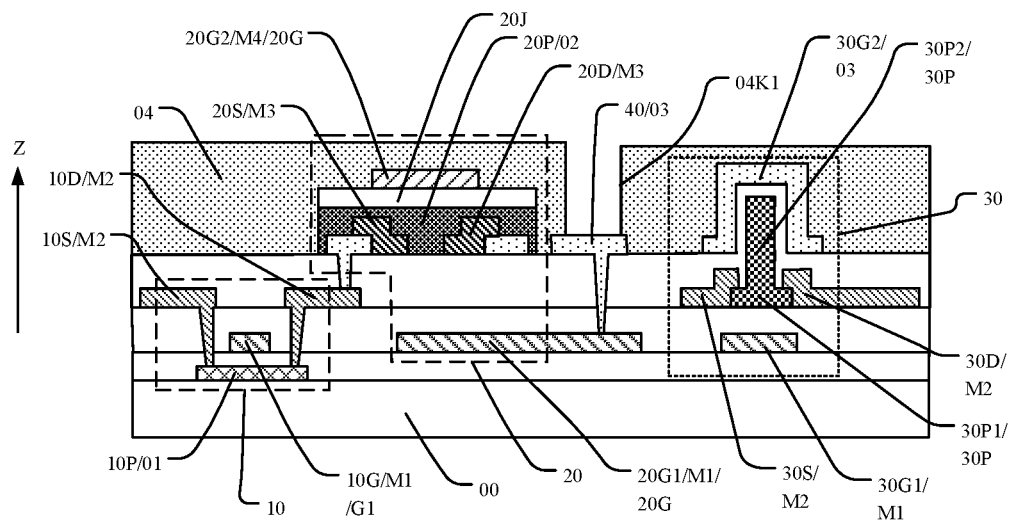
FIG. 16 is another schematic cross-sectional structural diagram of the detection unit of the detection substrate shown in FIG. 5.

FIG. 16 is another schematic cross-sectional structural diagram of the detection unit of the detection substrate shown in FIG. 5. Refer to FIG. 5 and FIG. 16. In some embodiments, the fabricate material of the first active layer 01 may include low temperature polysilicon, and the first active layer 01 may be located on the side of the first metal layer M1 close to the substrate 00; the third gate 30G1 of the photosensitive transistor serving as the photoelectric sensor element 30 may be located in the first metal layer M1; the active part 30P of the photosensitive transistor may include an amorphous silicon material, and the film layer where the active part 30P of the photosensitive transistor is located may be located on the side of the first metal layer M1 away from the substrate 00; and the film layer where the source electrode 30S and the drain electrode 30D of the photosensitive transistor are located may be located in the second metal layer M2.

In some embodiments, the fabrication material of the first active layer 01 may include a low temperature polysilicon (LTPS) material. That is, the inorganic transistor 10 may be a low temperature polysilicon transistor, and the active part 10P of the inorganic transistor 10 may be a low temperature polysilicon material. By setting the inorganic transistor 10 in the detection substrate 000 as a low temperature polysilicon transistor, the characteristics of high mobility and high driving speed of the low temperature polysilicon transistor can be used to improve the response speed of the inorganic transistor 10 and improve the overall detection effect of the substrate.

At this time, in order to ensure the photosensitive performance of the photosensitive transistor serving as the photoelectric sensor element 30, the active part 30P of the photosensitive transistor may still need to be made of amorphous silicon material. That is, the film layer where the active part 30P of the photosensitive transistor is located may be arranged in a different layer from the first active layer 01, and the film layer where the active part 30P of the photosensitive transistor is located may be located on the side of the first metal layer M1 away from the substrate 00. Since the film layer where the source electrode 10S and the drain electrode 10D of the inorganic transistor 10 are located may be located on the side of the first metal layer M1 away from the substrate 00, the film layer where the source electrode 30S and the drain electrode 30D of the photosensitive transistor are located may still be arranged on the second metal layer M2. That is, the source electrode 10S and the drain electrode 10D of the inorganic transistor 10 may be arranged in the same layer. In some embodiments, the first gate 20G1 of the organic transistor 20 may also be located in the first metal layer M1. That is, the first gate 20G1 of the organic transistor 20 may be arranged in the same layer as the third gate 30G1 of the photosensitive transistor. In this embodiment, the third gate 30G1 of the bottom gate of the photosensitive transistor may be fabricated by reusing the first metal layer M1, that is, arranged in the same layer as the gate electrode 10G of the inorganic transistor 10. The source electrode 30S and the drain electrode 30D of the photosensitive transistor may be fabricated by reusing the second metal layer M2, that is, arranged in the same layer as the source electrode 10S and drain electrode 10D of the inorganic transistor 10, thereby reducing the number of film layers in the substrate.

Figure 17:
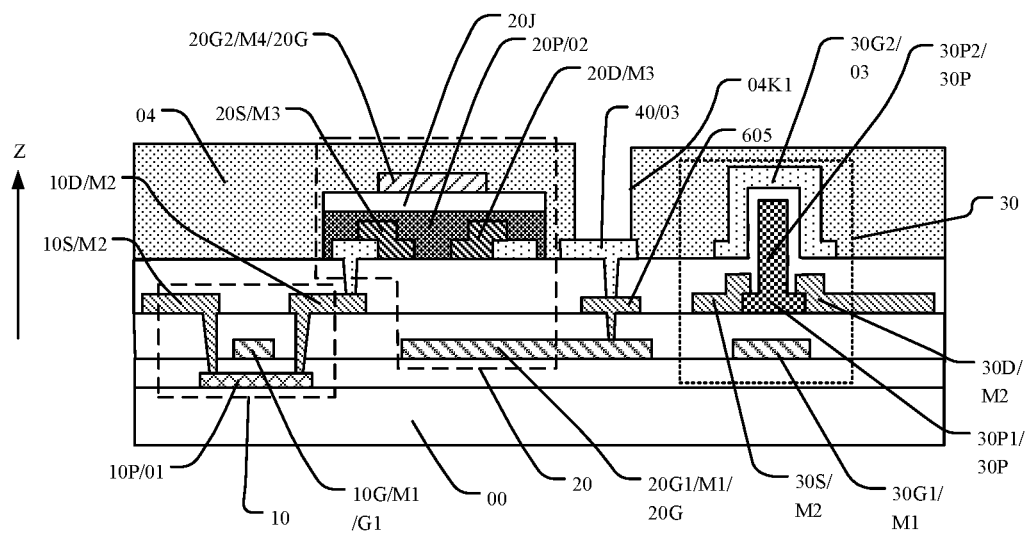
FIG. 17 is another schematic cross-sectional structural diagram of the detection unit of the detection substrate shown in FIG. 5.

FIG. 17 is another schematic cross-sectional structural diagram of the detection unit of the detection substrate shown in FIG. 5. Refer to FIG. 5 and FIG. 17. In some embodiments, when the first gate 20G1 of the organic transistor 20 of the first metal layer M1 is connected to the sensing electrode 40, in order to avoid the disconnection when the sensing electrode 40 and the first gate 20G1 of the bottom gate of the organic transistor 20 of different layers are connected through the via, a fifth pad layer 605 may be added between the sensing electrode 40 and the first gate 20G1 of the bottom gate of the organic transistor 20. The fifth pad layer 605 may be made of the same material as the second metal layer M2, thereby avoiding the disconnection between the sensing electrode 40 and the first gate 20G1 of the organic transistor 20 of different layers due to process fluctuations and errors during production, thereby improving the production yield of the substrate.

Figure 18:
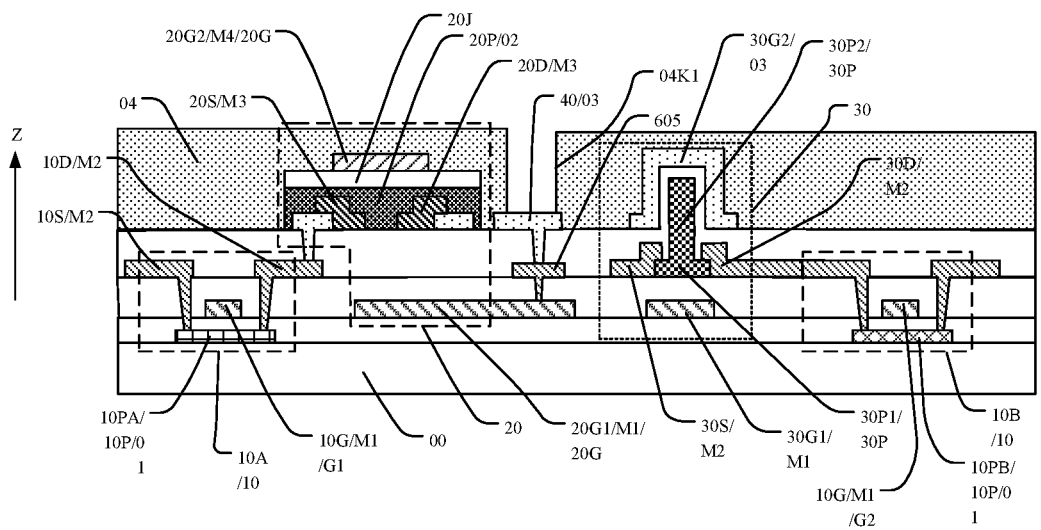
FIG. 18 is another schematic cross-sectional structural diagram of the detection unit of the detection substrate shown in FIG. 5.

FIG. 18 is another schematic cross-sectional structural diagram of the detection unit of the detection substrate shown in FIG. 5. Refer to FIG. 5 and FIG. 18. In some embodiments, the detection unit P may include at least two inorganic transistors 10, namely a first inorganic transistor 10A and a second inorganic transistor 10B. The active part 10PA of the first inorganic transistor 10A and the active part 10PB of the second inorganic transistor 10B may be of different types of dopes semiconductors.

In some embodiments, a detection unit P of the detection substrate 000 may include at least two inorganic transistors 10, namely the first inorganic transistor 10A and the second inorganic transistor 10B. The first inorganic transistor 10A may be connected to the organic transistor 20, and configured to control the sensing electrode 40 connected to the organic transistor 20 to realize biomolecule or ion signals sensing in the to-be-detected solution. The second inorganic transistor 10B may be connected to the photoelectric sensor element 30 for controlling the photoelectric sensor element 30 to realize fluorescence reaction detection, thereby realizing the time-division control of the biomolecule or ion signals sensing of the detection substrate 000 and the fluorescence reaction detection. When the biomolecule or ion signals sensing needs to be performed, the first inorganic transistor 10A may be turned on, and the second inorganic transistor 10B may be turned off, such that the sensing electrode 40 connected to the organic transistor 20 can sense biomolecules or ions. When the fluorescence reaction detection needs to be performed, the first inorganic transistor 10A may be turned off, and the second inorganic transistor 10B may be turned on, such that the photoelectric sensor element 30 can perform fluorescence reaction detection. In some embodiments, the type of the first inorganic transistor 10A connected to the organic transistor 20 and the types of the second inorganic transistor 10B connected to the photoelectric sensor element 30 may be the same. In this way, the first inorganic transistor 10A and the second inorganic transistor 10B may need to be connected to their own gates through different control signal lines to realize the time-division conduction control of the two inorganic transistors. Alternatively, in other embodiments, as shown in FIG. 18, the first inorganic transistor 10A and the second inorganic transistor 10B may both be low temperature polysilicon transistors. The active part 10PA of the first inorganic transistor 10A and the active part 10PB of the first inorganic transistor 10A may be of different types of doped semiconductors (which is illustrated in FIG. 18 with different filling patterns). By setting the doped semiconductor types of the active parts of the two inorganic transistors 10 to be different, the first inorganic transistor 10A may be one of an N-type transistor and a P-type transistor, and the second inorganic transistor 10B may be the other of the N-type transistor and the P-type transistor. At this time, the first inorganic transistor 10A and the second inorganic transistor 10B may be connected to their own gates through the same control signal line, such that the time-division conduction control of the two inorganic transistors can be realized, thereby reducing the number of signal lines in the substrate.

Refer to FIG. 5 and FIG. 11. In some embodiments, the first electrode layer 03 may include a first connection 032, and the source electrode 20S of the organic transistor 20 may be connected to the drain electrode 10D of at least one inorganic transistor 10 through the first connection 032.

In some embodiments, the one of the inorganic transistors 10 included in the detection unit P may be used as a switch tube of the organic transistor 20 to control the sensing electrode 40 connected to the organic transistor 20 to realize biomolecule or ion signals sensing in the to-be-detected solution. The source electrode 20S of the organic transistor 20 may be connected to the drain electrode 10D of the inorganic transistor 10, such that the signal conduction between the organic transistor 20 and the inorganic transistor 10 can be realized when the inorganic transistor 10 is turned on. Since the source electrode 20S and the drain electrode 20D of the organic transistor 20 and the film layer where the organic semiconductor part 20P is located may be located on the side of the film layer where the inorganic transistor 10 is located away from the substrate 00, the source electrode 20S of the organic transistor 20 and the drain electrode 10D of the inorganic transistor 10 may be connected through the first connection 032 to avoid the disconnection caused by the distance between the film layer where the source electrode 20S of the organic transistor 20 is located and the film layer where the drain electrode 10D of the inorganic transistor 10 is located being too far away from each other. In some embodiments, the first electrode layer 03 may be located between the film layer where the source electrode 20S of the organic transistor 20 is located and the film layer where the drain electrode 10D of the inorganic transistor 10 is located. Therefore, the first connection 032 may be arranged on the first electrode layer 03. That is, the first electrode layer 03 may be reused to form the first connection 032, which is beneficial to ensuring the electrical connection performance between the source electrode 20S of the organic transistor 20 and the drain electrode 10D of the inorganic transistor 10, and reducing the number of film layers of the substrate.

Figure 19:
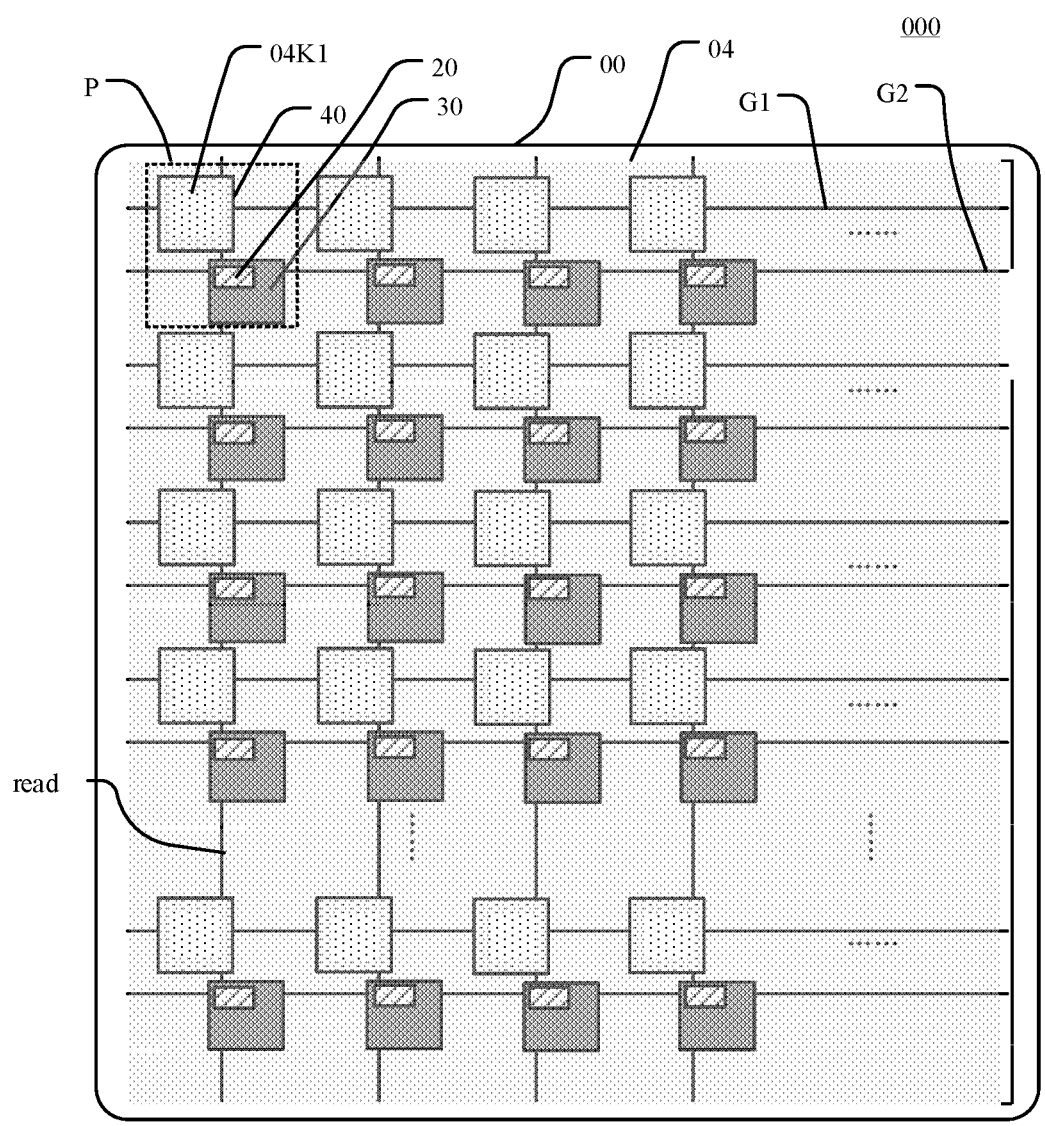
FIG. 19 is another schematic plan structural diagram of the detection substrate according to an embodiment of the present disclosure.
Figure 20:
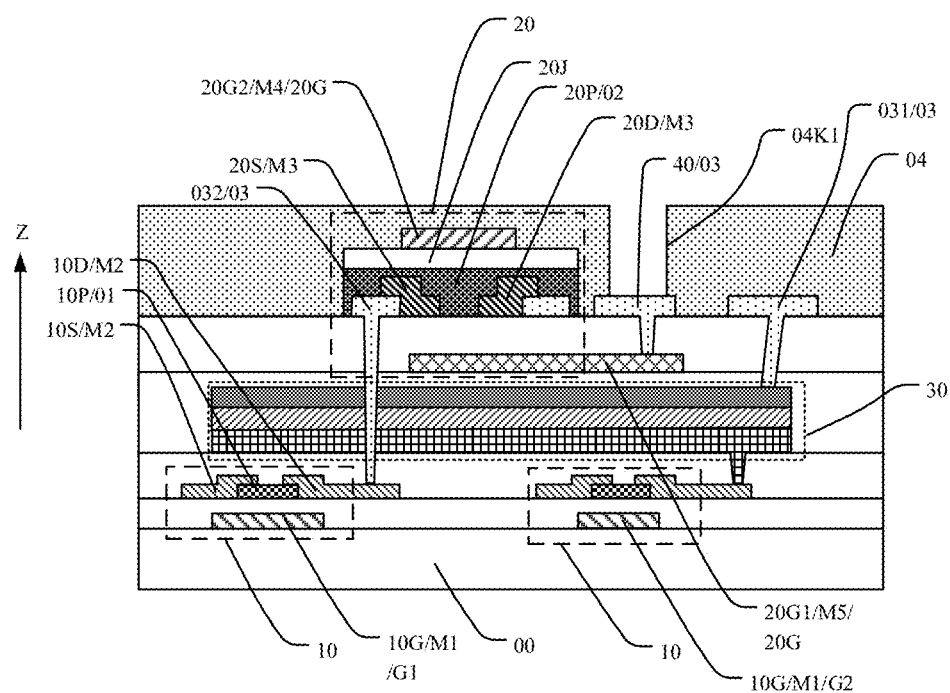
FIG. 20 is a schematic cross-sectional structural diagram of the detection unit of the detection substrate shown in FIG. 19.

FIG. 19 is another schematic plan structural diagram of the detection substrate according to an embodiment of the present disclosure, and FIG. 20 is a schematic cross-sectional structural diagram of the detection unit of the detection substrate shown in FIG. 19. Refer to FIG. 19 and FIG. 20. In some embodiments, in the direction Z perpendicular to the plane of the substrate 00, the organic transistor 20 and the photoelectric sensor element 30 may at least partially overlap each other, and the area of the orthographic projection of the photoelectric sensor element 30 on the plane where the substrate 00 is located may be larger than the area of the orthographic projection of the organic transistor 20 on the plane where the substrate 00 is located.

In some embodiments, in the detection substrate 000, when the structure of the detection unit P is fabricated on the side of the substrate 00, the film layer where the organic semiconductor part 20P is located may be located on the side where the film layer where inorganic transistor 10 is located and the film layer where the photoelectric sensor element 30 is located away from the substrate 00. In this way, the performance failure of the fabricated organic transistor 20 due to high temperature can be avoided, and the accuracy of the detection results can be ensured. In the direction Z perpendicular to the plane of the substrate 00, the organic transistor 20 may be arranged to at least partially overlap the photoelectric sensor element 30. That is, the film layer of the organic transistor 20 may not only be located on the side of the film layer where the photoelectric sensor element 30 is located away from the substrate 00, but also place the photoelectric sensor element 30 directly above the photoelectric sensor element 30. In this way, the space occupied by a detection unit P on the substrate can be reduced, which is beneficial to improving the arrangement density of the detection units P in the detection substrate 000 and ensuring the detection capability of the substrate. In addition, when the organic transistor 20 is arranged to at least partially overlap the photoelectric sensor element 30 in the direction Z perpendicular to the plane of the substrate 00, and the film layer structure of the organic transistor 20 is arranged to be located on the side of the film layer where the photoelectric sensor element 30 is located away from the substrate 00, the area of the orthographic projection of the photoelectric sensor element 30 on the plane where the substrate 00 is located may be larger than the area of the orthographic projection of the organic transistor 20 on the plane where the substrate 00 is located. In this way, the orthographic projection of the photoelectric sensor element 30 on the plane where the substrate 00 is located can exceed the range of the orthographic projection of the organic transistor 20 on the plane where the substrate 00 is located, such that more light can be sensed by the photoelectric sensor element 30 under the organic transistor 20, thereby enhancing the photosensitive performance of the photoelectric sensor element 30.

It should be understood that in the embodiment of FIG. 20, the photoelectric sensor element 30 is a PIN-type photodiode as an example for illustrate. During specific implementations, the photoelectric sensor element 30 may also be other structures such as photosensitive transistors, which are not limited in the embodiments of the present disclosure.

Refer to FIG. 19 and FIG. 20. In some embodiments, the film layer where the first gate 20G1 of the organic transistor 20 is located may be located on the side of the film layer where the photoelectric sensor element 30 is located away from the substrate 00. In some embodiments, the detection substrate 000 may further include a fifth metal layer M5. The fifth metal layer M5 may be located between the film layer where the sensing electrode 40 is located and the film layer where the photoelectric sensor element 30 is located, and the first gate 20G1 of the organic transistor 20 may be located in the fifth metal layer M5.

In some embodiments, in the detection substrate 000, when the structure of the detection unit P is fabricated on the side of the substrate 00, in the direction Z perpendicular to the plane of the substrate 00, the organic transistor 20 and the photoelectric sensor element 30 may be arranged to at least partially overlap each other to reduce the space occupied by a single detection unit P. Since the film layer where the photoelectric sensor element 30 is located may be located on the side of the film layer where the photoelectric sensor element 30 is located away from the substrate 00, the fifth metal layer M5 may be additionally arranged between the film layer where the sensing electrode 40 is located and the film layer where the photoelectric sensor element 30 is located to form the first gate 20G1 of the organic transistor 20. In this way, the first gate 20G1 of the bottom gate of the organic transistor 20 of the fifth metal layer M5 can be electrically connected to the sensing electrode 40 to ensure the sensing effect of the organic transistor 20.

Figure 21:
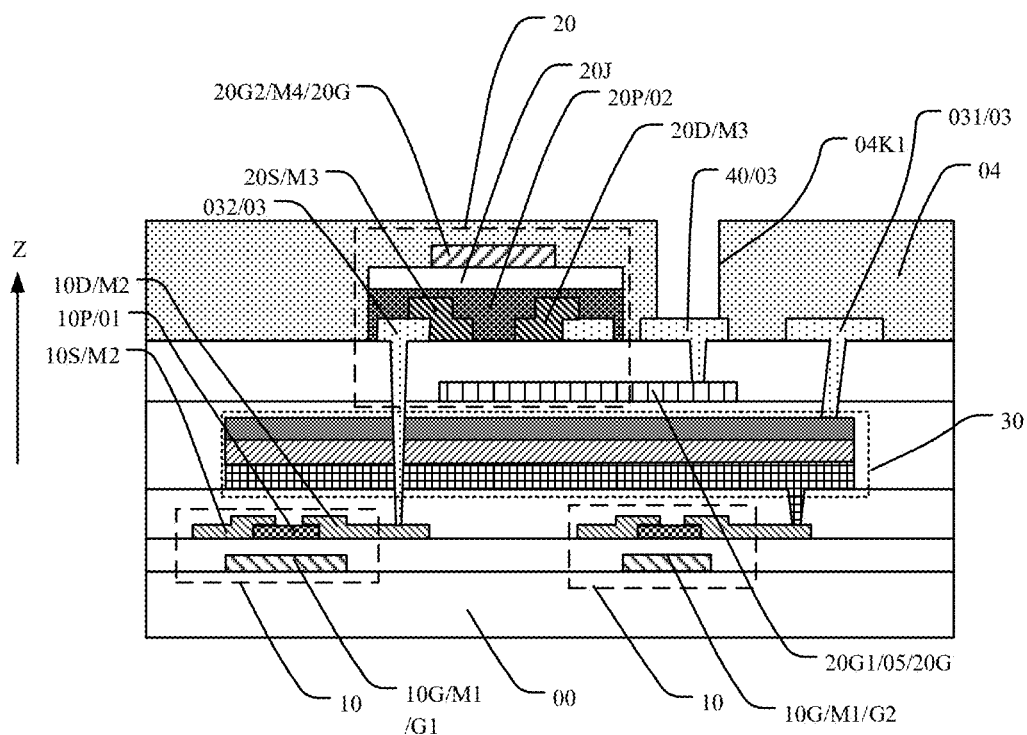
FIG. 21 is another schematic cross-sectional structural diagram of the detection unit of the detection substrate shown in FIG. 19.

FIG. 21 is another schematic cross-sectional structural diagram of the detection unit of the detection substrate shown in FIG. 19. Refer to FIG. 19 and FIG. 21. In some embodiments, the detection substrate 000 may further include a second electrode layer 05. The second electrode layer 05 may be located between the film layer where the sensing electrode 40 is located and the film layer where the photoelectric sensor element 30 is located, and the first gate 20G1 of the organic transistor 20 may be located in the second electrode layer 05.

In some embodiments, in the detection substrate 000, when the structure of the detection unit P is fabricated on the side of the substrate 00, in the direction Z perpendicular to the plane of the substrate 00, the organic transistor 20 and the photoelectric sensor element 30 may be arranged to at least partially overlap each other to reduce the space occupied by a single detection unit P. In addition, the second electrode layer 05 may be arranged between the between the film layer where the sensing electrode 40 is located and the film layer where the photoelectric sensor element 30 is located to fabricate the first gate 20G1 of the organic transistor 20. The material of the second electrode layer 05 may be a transparent conductive material, such as indium tin oxide (ITO), etc. In this way, the first gate of the bottom gate of the organic transistor 20 of the second electrode layer 05 can be electrically connected to the sensing electrode 40 to ensure the sensing effect of the organic transistor 20, and the light transmittance can also be increased through the first gate 20G1 made of transparent conductive material to improve the photosensitive effective of the photoelectric sensor element 30.

Figure 22:
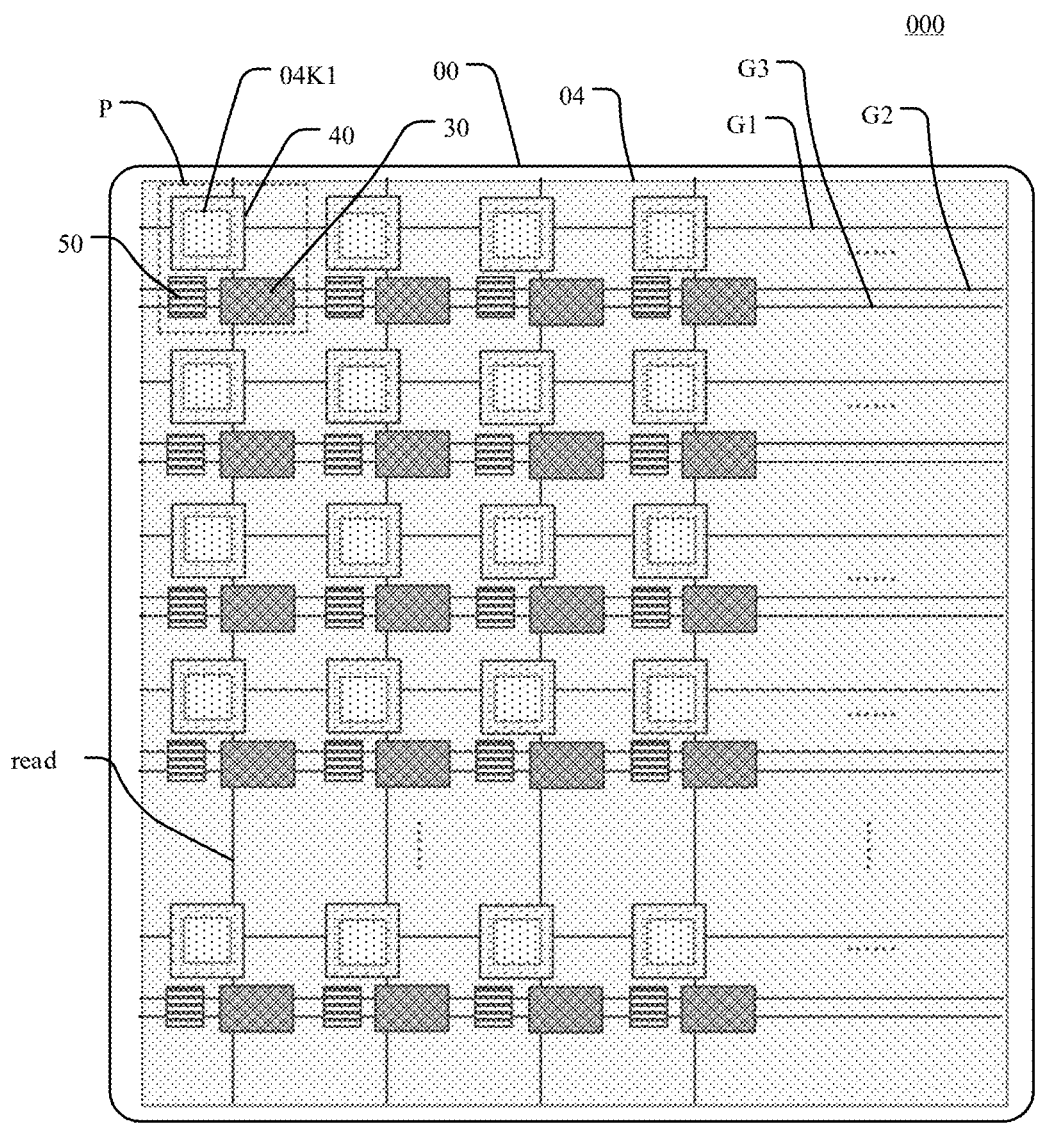
FIG. 22 is another schematic plan structural diagram of the detection substrate according to an embodiment of the present disclosure.
Figure 23:
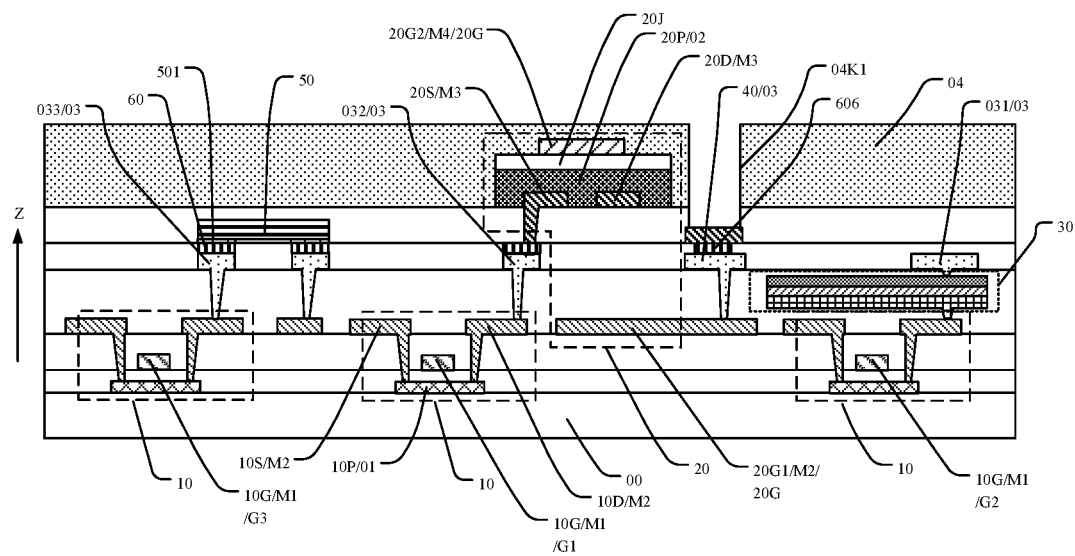
FIG. 23 is a schematic cross-sectional structural diagram of the detection unit of the detection substrate shown in FIG. 22.

FIG. 22 is another schematic plan structural diagram of the detection substrate according to an embodiment of the present disclosure, and FIG. 23 is a schematic cross-sectional structural diagram of the detection unit of the detection substrate shown in FIG. 22. In some embodiments, the detection unit P may further include a light-emitting element 50, and the film layer where the light-emitting element 50 is located may be located between the film layer where the organic semiconductor part 20P is located and the film layer where the inorganic transistor 10 is located; and an anode 501 of the light-emitting element 50 may be connected to the drain of at least one inorganic transistor 10 through a second connection 033, the second connection 033 may be arranged in the same layer as the sensing electrode 40.

In some embodiments, each detection unit P in the detection substrate 000 may also be integrated with light-emitting elements 50, and the light-emitting elements 50 may be arranged on the substrate 00 of the detection substrate 000 in an array. In some embodiments, the light-emitting element 50 in this embodiment may be a micro light-emitting diode (micro-LED) or a sub-millimeter light-emitting diode (mini-LED), and the light-emitting element 50 may be bound in a film layer on one side of the substrate 00. The inorganic transistor 10 in this embodiment is illustrated by taking a low temperature polysilicon transistor as an example. During specific implementations, the types of the inorganic transistors 10 are not limited hereto. In this embodiment, the film layer where the light-emitting element 50 is located may be located between the film layer where the organic semiconductor part 20P is located and the film layer where the inorganic transistor 10 is located to realize the electrical connection between the inorganic transistor 10 and the light-emitting element 50. Controlling the light-emitting effect of the light-emitting element 50 through the inorganic transistor 10 can also avoid affecting the low-temperature fabrication process of the organic transistor 20. The anode 501 of the light-emitting element 50 may be connected to the drain of at least one inorganic transistor 10, and the switch transistor 10 electrically connected to the light-emitting element 50 may be used as a switch tube of the light-emitting element 50. The anode 501 of the light-emitting element 50 and the drain of the at least one inorganic transistor 10 may be connected through the substrate 00, which can reduce the depth of the via between the anode 501 of the light-emitting element 50 and the drain of the at least one inorganic transistor 10 to reduce the fabrication difficulty. In addition, the second connection 033 may be arranged in the same layer as the sensing electrode 40, and the second connection 033 may be arranged by reusing the film layer on the substrate, which is beneficial to reducing the thickness of the substrate. By integrating the light-emitting element 50 in the detection substrate 000, the detection substrate 000 can also have the effect of light-emitting display, which is beneficial to reducing the size and overall cost of the entire module when the detection substrate 000 realizes the display function.

Refer to FIG. 22 and FIG. 23. In some embodiments, when the anode 501 of the light-emitting element 50 is connected to the drain of at least one inorganic transistor 10 through the second connection 033, a metal copper pad 60 may be arranged on the side of the second connection 033 away from the substrate 00 for bonding and welding the light-emitting element 50, and the bonding stability of the light-emitting element 50 can be ensured by the structure of the metal copper pad 60.

In some embodiments, the detection substrate 000 may further include a third scan line G3 for controlling the light-emitting element 50 to emit light. The third scan line G3 may be connected to the gate of the inorganic transistor 10 connected to the light-emitting element 50 in the detection unit P in the same row (as shown in FIG. 23), and the inorganic transistor 10 connected to the third scan line G3 can realize the control of the light emission of the light-emitting element 50.

In some embodiments, when the detection unit P includes the light-emitting element 50 and the photoelectric sensor element 30, a light-shielding part (not shown in the accompanying drawings) may be added between the light-emitting element 50 and the photoelectric sensor element 30 to avoid the light emitted from the light-emitting element 50 from affecting the photosensitive effect of the photoelectric sensor element 30. The embodiments of the present disclosure do not specifically limit the fabrication film layer and the fabrication material of the light-shielding part, as long as the light-shielding part is located between the light-emitting element 50 and the photoelectric sensor element 30 to shield light.

It should be understood that the embodiment of FIG. 23 takes the photoelectric sensor element 30 as a PIN-type photodiode as an example for illustration. During specific implementations, the photoelectric sensor element 30 may also be other structures, such as a photosensitive transistor, which is not limited in the embodiments of the present disclosure.

Refer to FIG. 23. In some embodiments, when the light-emitting element 50 is integrated in the detection substrate 000, when the organic transistor 20 is connected to the inorganic transistor 10, the first connection 032 may be made of the first electrode layer 03 or the film layer where the metal copper pad 60 is located. Alternatively, the first connection 032 may be jointly fabricated by the first electrode layer 03 and the film layer where the metal copper pad 60 is located, thereby realizing the electrical connection between the organic transistor 20 and the inorganic transistor 10. As shown in FIG. 23, in some embodiments, the side of the sensing electrode 40 away from the substrate 00 may be arranged with a cushion layer 606 on the same layer as the film layer where the metal copper pad 60 is located, such that the sensing electrode 40 can be closer to the first protective layer 04. In addition, gold (same material as the source electrode 20S and the drain electrode 20D of the organic transistor 20) may also be used to decorate the top of the cushion layer 606 of the same layer as the film layer where the metal copper pad 60 is located, such that the surface of the sensing electrode 40 can have the adsorption function of specific ions or biomolecules, thereby realizing the sensing of specific ions or biomolecules.

Figure 24:
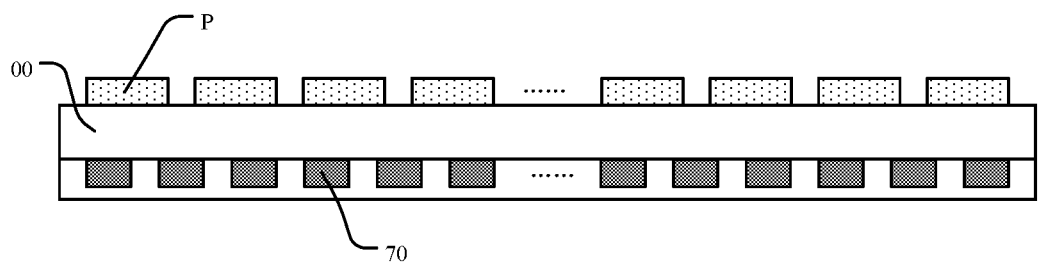
FIG. 24 is a schematic cross-sectional structural diagram of the detection substrate shown in FIG. 1.

FIG. 24 is a schematic cross-sectional structural diagram of the detection substrate shown in FIG. 1. Refer to FIG. 1 and FIG. 24. In some embodiments, the detection substrate 000 may further include a plurality of excitation light sources 70 arranged in an array, and the excitation light sources 70 may be located on the side of the substrate 00 away from the detection unit P.

In some embodiments, the detection substrate 000 may further include a plurality of excitation light sources 70, and the plurality of excitation light sources 70 may be arranged in an array on the side of the substrate 00 away from the detection unit P. In some embodiments, the plurality of excitation light sources 70 may be lamp beads arranged in an array, or the plurality of excitation light sources 70 may be other flat light sources with different wavelength output capabilities. By arranging the plurality of excitation light sources 70 on the side of the detection substrate 000 away from the detection unit P, the photoluminescence of the fluorescence protein can be realized by the electroluminescence of the excitation light sources 70, thereby realizing the detection function of the fluorescence protein of the detection substrate 000. Further, the detection substrate 000 provided by the embodiments of the present disclosure can be applied to the detection of various biological reaction calibrations, thereby achieving diversified detection effects.

Figure 25:
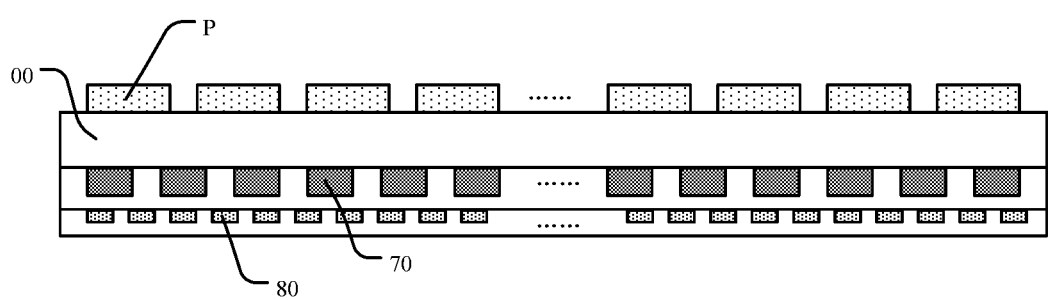
FIG. 25 is another schematic cross-sectional structural diagram of the detection substrate shown in FIG. 1.

FIG. 25 is another schematic cross-sectional structural diagram of the detection substrate shown in FIG. 1. Refer to FIG. 1 and FIG. 25. In some embodiments, the detection substrate 000 may further include a heating component 80, and the heating component 80 may be located on the side of the substrate 00 away from the detection unit P. In some embodiments, the heating component 80 may be located on the side of the excitation light sources 70 away from the substrate 00. Further, the heating component 80 may include any of metal traces or resistive devices.

In some embodiments, the detection substrate 000 may further include a heating component 80. The heating component 80 and the excitation light source 70 may be disposed on the side of the substrate 00 away from the detection unit P, or the heating component 80 and the excitation light source 70 may be disposed in the detection substrate 000 independent, which is not limited in the embodiments of the present disclosure. In this embodiment, the heating component 80 is located on the side of the excitation light source 70 away from the substrate 00 as an example for illustration. The heating component 80 may include any of metal traces or resistive devices. In the heating component 80 of the metal trace or the resistive device in this embodiment, the temperature control of the detection substrate 000 may be realized by inputting an electrical signal to the heating component 80. In this way, the detection substrate 000 of this embodiment can be used for reaction and detection at a specific temperature, thereby achieving diversified detection effects. For example, when using the detection substrate 000 of this embodiment to perform a real-time fluorescence quantitative polymerase chain reaction (PCR), the substrate may be heated multiple times by the heating component 80 to realize deoxyribonucleic acid (DNA) amplification. In the process of DNA amplification, the target fragment falls off the fluorescence protein, and the number of target DNA molecules in the amplification process can be identified by detecting the luminescence intensity of the fluorescence protein, such that real-time nucleic acid detection can be realized.

Figure 26:
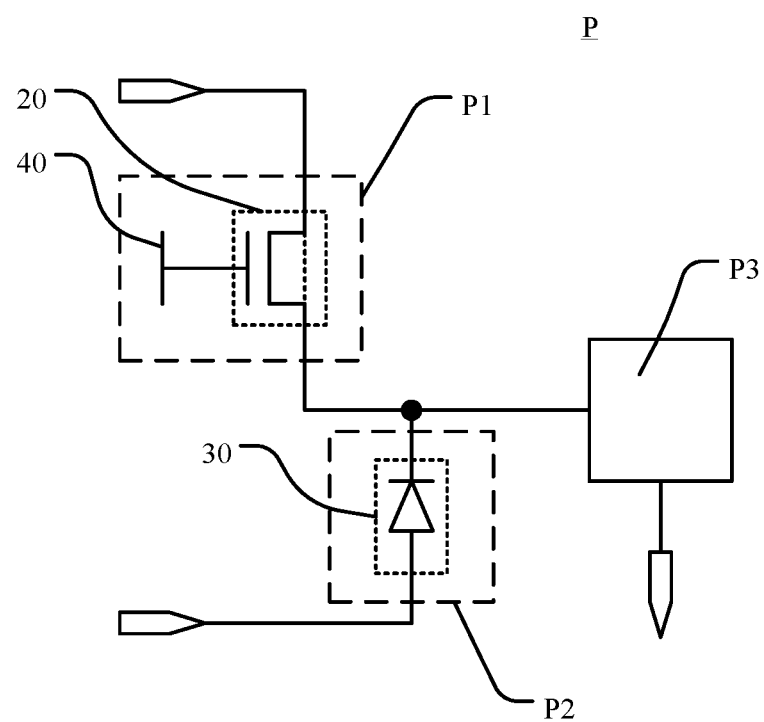
FIG. 26 is schematic diagram of an electrical connection structure of the detection unit in a detection circuit according to an embodiment of the present disclosure.

FIG. 26 is schematic diagram of an electrical connection structure of the detection unit in a detection circuit according to an embodiment of the present disclosure. Refer to FIG. 1 and FIG. 26. In some embodiments, the detection circuit may be fabricated in the detection substrate 000. The detection circuit may include a plurality of detection units P. In some embodiments, the detection unit P may include a first detection module P1, a second detection module P2, and a reading module P3 that are electrically connected, and the first detection module P1 and the second detection module P2 may be both connected to the reading module P3. The first detection module P1 may include the organic transistor 20 and the sensing electrode 40, and the gate of the organic transistor 20 may be electrically connected to the sensing electrode 40. The second detection module P2 may include the photoelectric sensor element 30.

An embodiment of the present disclosure provides a detection circuit, which can not only be used to realize the sensing of biomolecules, but also can realize the detection function of fluorescence reaction. The structure of the detection circuit may be fabricated on the substrate 00 in the detection substrate 000 described in the foregoing embodiments. In some embodiments, the detection circuit may include a plurality of detection units P, and the plurality of detection units P may be arranged in an array or other arrangements, which is not limited in the embodiments of the present disclosure. The detection circuit may include the first detection module P1, the second detection module P2, and the reading module P3 that are electrically connected, and the first detection module P1 and the second detection module P2 may be both connected to the reading module P3. The first detection module P1 may be used to realize the sensing of biomolecules when turned on. The first detection module P1 may include the organic transistor 20 and the sensing electrode 40, and the gate of the organic transistor 20 may be electrically connected to the sensing electrode 40. The organic transistor 20 has large sub-threshold swing and large leakage, which is suitable for use as a sensing element for biomolecules. The sensing electrode 40 may be a biomolecule or ion sensitive electrode, and molecules or ions in the to-be-detected solution can be easily adsorbed to the surface of the sensing electrode 40, thereby changing the potential of the sensing electrode 40. Therefore, the first detection module P1 including the organic transistor 20 and the sensing electrode 40 connected to the organic transistor 20 can be used for the detection unit P to detect biomolecules. The first detection module P1 may be connected to the reading module P3, and after the first detection module P1 completes the detection of biomolecules or ions in the to-be-detected solution, the detection result may be read and output through the reading module P3. The second detection module P2 may be used to realize the detection function of the fluorescence reaction when turned on. The second detection module P2 may include the photoelectric sensor element 30. The photoelectric sensor element 30 may be any photoelectric sensor element, such as a photosensitive diode, that can realize the sensing and identification of light signals and convert the light signals into electrical signals. The type of the photoelectric sensor element is not limited in the embodiments of the present disclosure. The second detection module P2 may be connected to the reading module P3, and the detection result may be read and output by the reading module P3 after the second detection module P2 completes the detection of the fluorescence reaction.

As shown in FIG. 26. In some embodiments, the organic transistor 20 included in the first detection module P1 in the detection circuit may have a double-gate structure. One gate of the organic transistor 20 may be connected to the sensing electrode 40, such that the sensing electrode 40 can be exposed to the to-be-detected solution and be in contact with the to-be-detected solution to absorb the ionic or molecular structures to be detected in the solution. The other gate of the organic transistor 20 may be used to control the organic transistor 20 to operate in the sub-threshold range, thereby ensuring the conduction operation of the organic transistor 20.

In the detection circuit provided by the embodiments of the present disclosure, each detection unit P can realize the sensing of biological reactions in the fluid through the organic transistor 20 of the first detection module P1 and the sensing electrode 40 connected to the organic transistor 20. Further, each detection unit P can also realize the fluorescence reaction detection function of the substrate through the photoelectric sensor element 30 of the second detection module P2. In addition, the detection results of the first detection module P1 and the second detection module P2 can be read and output through the reading module P3. That is, the detection circuit of the present disclosure can realize the integration of biological reaction detection and fluorescence detection, and realize the diversified detection functions of the same detection, which is beneficial to improving the detection efficiency.

It should be understood that the embodiment of FIG. 26 is only a block diagram to illustrate the reading module P3. During specific implementations, the structure of the reading module P3 in the detection circuit may include electrical connection structures, such as transistors, to realize functions such as amplifying the read signals to ensure the output efficiency of the detection results of the detection circuit.

It should be noted that the embodiment of FIG. 26 is an example to illustrate the circuit connection structure of the detection unit P of the detection circuit. During specific implementations, the circuit connection structure of the detection unit P may include, but is not limited to thereto. In addition, the detection unit P may include other transistors used as switches or storage capacitors used for storing signals, which will not be described in detail in the present disclosure.

Figure 27:
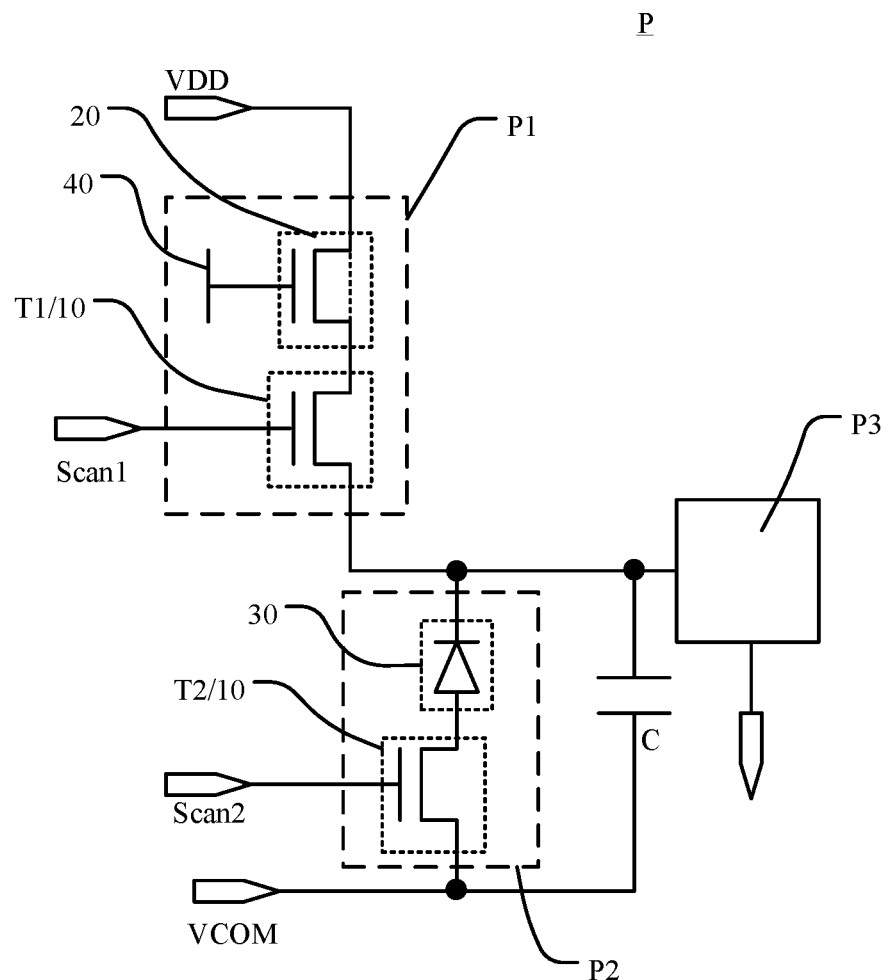
FIG. 27 is a schematic diagram of another electrical connection structure of the detection unit shown in FIG. 26.

FIG. 27 is a schematic diagram of another electrical connection structure of the detection unit shown in FIG. 26. Refer to FIG. 1, FIG. 26, and FIG. 27. In some embodiments, the first detection module P1 may further include a first selection transistor T1. The gate of the first selection transistor T1 may be connected to a first selection control signal Scan1, the first electrode of the first selection transistor T1 may be connected to the drain of the organic transistor 20, the source of the organic transistor 20 may be connected to a first power supply signal VDD, and the second electrode of the first selection transistor T1 may be connected to the reading module P3. The second detection module P2 may include a second selection transistor T2. The gate of the second selection transistor T2 may be connected to a second selection control signal Scan2, the first electrode of the second selection transistor T2 may be connected to the first electrode of the photoelectric sensor element 30, the second electrode of the photoelectric sensor element 30 may be connected to the reading module P3, and the second electrode of the second selection transistor T2 may be connected to a second power supply signal VCOM. The detection unit P may further include a capacitor C. The first electrode of the capacitor C may be respectively connected to the second electrode of the first selection transistor T1 and the second electrode of the photoelectric sensor element 30, and the second electrode of the capacitor C may be connected to the second power supply signal VCOM. In some embodiments, the first selection transistor T1 and the second selection transistor T2 may both be inorganic transistors 10.

In some embodiments, in the detection circuit on the substrate 00 of the detection substrate 000 of the above embodiment, the detection circuit may include the first detection module P1, the second detection module P2, and the reading module P3 that are electrically connected, and the first detection module P1 and the second detection module P2 may be both connected to the reading module P3. The first detection module P1 may include the organic transistor 20 and the sensing electrode 40, and the gate of the organic transistor 20 may be electrically connected to the sensing electrode 40. The first detection module P1 may further include the first selection transistor T1. The gate of the first selection transistor T1 may be connected to the first selection control signal Scan1, and the first selection control signal Scan1 may be used to control the conduction of the first selection transistor T1. When the first selection transistor T1 is an N-type transistor, the first selection control signal Scan1 may be a high-level signal input to the gate of the first selection transistor T1, and the first selection transistor T1 may be turned on. On the contrary, the first selection control signal Scan1 may be a low-level signal input to the gate of the first selection transistor T1, and the first selection transistor T1 may be turned off. The first electrode of the first selection transistor T1 may be connected to the drain of the organic transistor 20, the source electrode of the organic transistor 20 may be connected to the first power supply signal VDD, and the second electrode of the first selection transistor T1 may be connected to the reading module P3. That is, the first selection transistor T1 can control the first detection module P1 to be turned on to complete the sensing of biomolecules. In FIG. 27, the first selection transistor T1 is an N-type transistor as an example for illustration (during specific implementations, the first selection transistor T1 may also be a P-type transistor). When the detection circuit needs to complete the sensing of biomolecules, the first selection control signal Scan1 of the high-level signal can be input to the gate of the first selection transistor T1 to turn on the first selection transistor T1. The path of the organic transistor 20, the first selection transistor T1, and the capacitor C can be formed between the first power supply signal VDD and the second power supply signal VCOM. The organic transistor 20 may have a double-gate structure. One of the gates of the organic transistor 20 may be connected to the sensing electrode 40, such that the sensing electrode 40 can be exposed to the to-be-detected solution and be in contact with the to-be-detected solution to adsorb the ionic or molecular structures in the to-be-detected solution. The other gate of the organic transistor 20 may be used to control the organic transistor 20 to operate in the sub-threshold range, thereby ensuring the conduction operation of the organic transistor 20. Molecules and ions un the to-be-detected solution may be adsorbed to the surface of the sensing electrode 40, thereby changing the potential of the sensing electrode 40. At this time, the voltage of one gate of the organic transistor 20 connected to the sensing electrode 40 may also change, resulting in a change in the output current through the organic transistor 20 and a change in the threshold voltage of the organic transistor 20, thereby changing the voltage of the two electrodes of the capacitor to realize the charging and discharging of the capacitor C. The current change of the detection circuit may be read and output by the reading module P3, thereby realizing the sensing of biomolecular or ionic signals in the to-be-detected solution.

In some embodiments, the second selection transistor T2 may include the photoelectric sensor element 30, and the second selection transistor T2 may further include the second selection transistor T2. The gate of the second selection transistor T2 may be connected to the second selection control signal Scan2, and the second selection control signal Scan2 may be used to control the conduction of the second selection transistor T2. When the second selection transistor T2 is an N-type transistor, the second selection control signal Scan2 may be a high-level signal input to the gate of the second selection transistor T2 to turn on the second selection transistor T2. On the contrary, when the second selection control signal Scan2 is a low-level signal input to the gate of the second selection transistor T2, the second selection transistor T2 may be turned off. The first electrode of the second selection transistor T2 may be connected to the first electrode of the photoelectric sensor element 30, the second electrode of the photoelectric sensor element 30 may be connected to the reading module P3, and the second electrode of the second selection transistor T2 may be connected to the second power supply signal VCOM. That is, the second selection transistor T2 may control the second detection module P2 to be turned on to complete the detection of the fluorescence reaction. In FIG. 27, the second selection transistor T2 is an N-type transistor as an example for illustration (during specific implementations, the second selection transistor T2 may also be a P-type transistor). When the detection circuit needs to complete the detection of the fluorescence reaction, the second selection control signal Scan2 of the high-level signal can be input to the gate of the second selection transistor T2 to turn on the second selection transistor T2. At this time, a path of the second power supply signal VCOM, the second selection transistor T2, and the photoelectric sensor element 30 can be formed. The photoelectric sensor element 30 may generate photogenerated carriers after receiving light, thereby charging and discharging the capacitor C, and the change of the voltage of the capacitor C may be read and output by the reading module P3, thereby realizing the detection of the fluorescence reaction.

In some embodiments, in the detection circuit, the first detection module P1 may be arranged to include the first selection transistor T1, and the second detection module P2 may be arranged to include the second selection transistor T2. The first selection transistor T1 and the second selection transistor T2 may be used as switch tubes for the detection circuit. That is, the first selection transistor T1 may be understood as the switch tube of the first detection module P1, and the second selection transistor T2 may be understood as the switch tube of the second detection module P2. When the first detection module P1 is sensing biomolecules, the photoelectric sensor element 30 can be controlled to not operate through the second selection transistor T2 of the second detection module P2; and when the second detection module P2 is performing fluorescence reaction detection work, the organic transistor 20 can be controlled to not operate through the first selection transistor T1 of the second detection module P2, thereby reducing the power consumption of the circuit. Since the first selection transistor T1 and the second selection transistor T2 may only need to play a switching role, these transistors may both be the inorganic transistor 10 structure commonly used in circuit structures, which is beneficial to reduce the difficulty of the circuit structure fabrication process.

In some embodiments, the photoelectric sensor element 30 may include a photodiode, such as a PIN-type photodiode. The PIN-type photodiode has the advantages of small junction capacitance, fast response speed, and high sensitivity, which can improve the photosensitive detection capability of the detection unit P. During specific implementations. The structure of the photoelectric sensor element 30 may include, but is not limited to the PIN-type photodiode.

Figure 28:
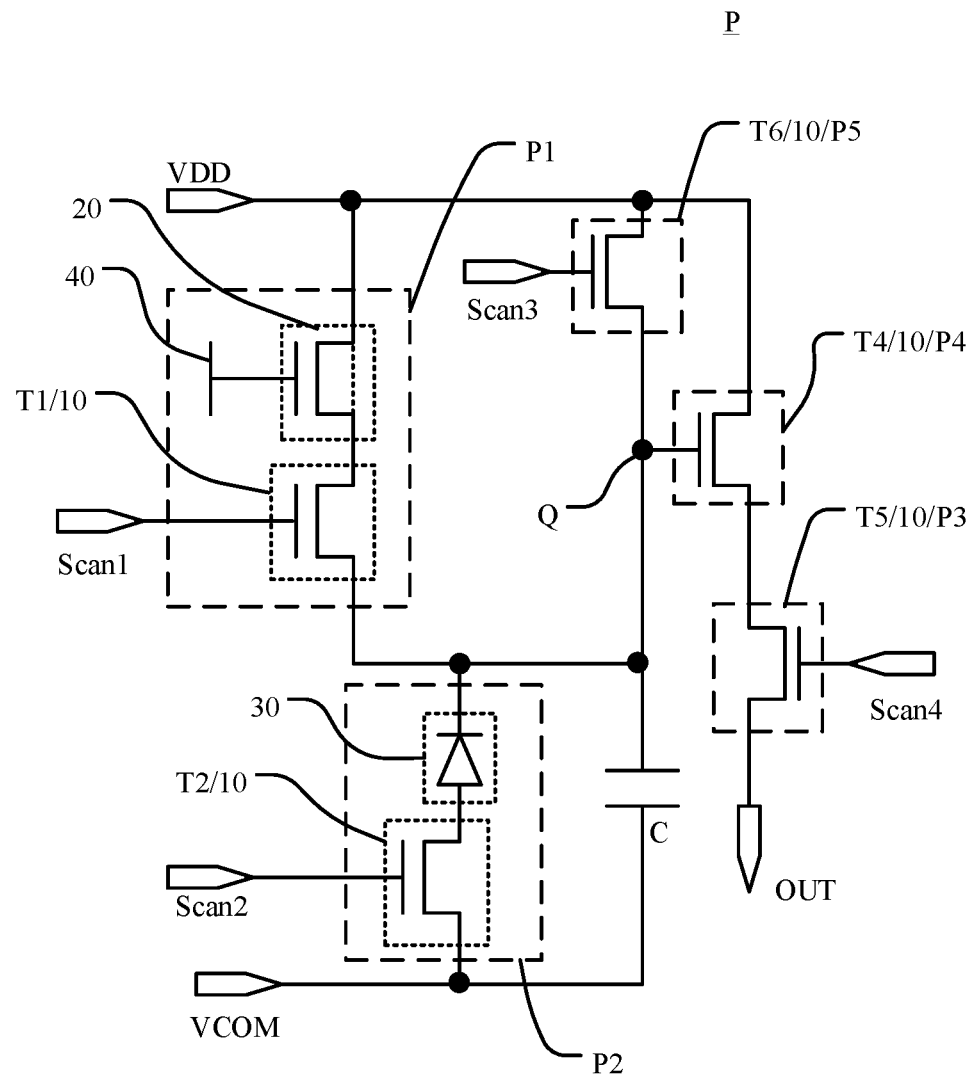
FIG. 28 is a schematic diagram of another electrical connection structure of one detection unit shown in FIG. 26.

FIG. 28 is a schematic diagram of another electrical connection structure of one detection unit shown in FIG. 26. Refer to FIG. 1, FIG. 26, FIG. 27, and FIG. 28. In some embodiments, the detection unit P may further include an amplification module P4 and a reset module P5. The amplification module P4 may include a fourth transistor T4. The gate of the fourth transistor T4 may be respectively connected to the second electrode of the first selection transistor T1 and the second electrode of the photoelectric sensor element 30, the first electrode of the fourth transistor T4 may be connected to the first power supply signal VDD, and the second electrode of the fourth transistor T4 may be connected to the reading module P3. The reading module P3 may include a fifth transistor T5. The gate of the fifth transistor T5 may be connected to a read control signal Scan4, the first electrode of the fifth transistor T5 may be connected to the second electrode of the fourth transistor T4, and the second electrode of the fifth transistor T5 may be connected to an output terminal OUT. The reset module P5 may include a sixth transistor T6. The gate of the sixth transistor T6 may be connected to a reset signal Scan3, the first electrode of the sixth transistor T6 may be connected to the first power supply signal VDD, and the second electrode of the sixth transistor T6 may be respectively connected to the second electrode of the first selection transistor T1 and the second electrode of the photoelectric sensor element 30. In some embodiments, the fourth transistor T4, the fifth transistor T5, and the sixth transistor T6 may all be inorganic transistors.

In some embodiments, the detection unit P may further include the amplification module P4 and the reset module P5. The reset module P5 may include the sixth transistor T6. The gate of the sixth transistor T6 may be connected to the reset signal Scan3, and the reset signal Scan3 may be used to control the conduction of the sixth transistor T6. As shown in FIG. 28, when the sixth transistor T6 is an N-type transistor, the reset signal Scan3 is a high-level signal input to the gate of the sixth transistor T6, the sixth transistor T6 may be turned on. On the contrary, when the reset signal Scan3 is a low-level signal input to the gate of the sixth transistor T6 may be turned off. After at least one detection operation is performed, the sixth transistor T6 may be controlled to be turned on by the reset signal Scan3. A path can be formed between the first power supply signal VDD, the sixth transistor T6, and the second power supply signal VCOM to reset the potential of the Q point connected to the reading module P3 in the detection circuit to ensure the detection accuracy of the next detection.

In some embodiments, the amplification module P4 may include the fourth transistor T4. The gate of the fourth transistor T4 may be respectively connected to the second electrode of the first selection transistor T1 and the second electrode of the photoelectric sensor element 30. The first electrode of the fourth transistor T4 may be connected to the first power supply signal VDD, and the second electrode of the fourth transistor T4 may be connected to the reading module P3. That is, the gate of the fourth transistor T4 may be connected to the Q potential. When the first detection module P1 and the second detection module P2 are performing detection operations, the potential of the Q point will change, and the fourth transistor T4 can serve the role of amplifying the signal. The potential change at the Q point causes the current flowing through the fourth transistor T4 to exhibit an exponential change, thereby realizing signal amplification, such that the detection result of the current change can be easily read and output by the reading module P3.

In some embodiments, the reading module P3 may include the fifth transistor T5. The gate of the fifth transistor T5 may be connected to the read control signal Scan4, and the first electrode of the fifth transistor T5 may be connected to the second electrode of the fourth transistor T4. The read control signal Scan4 may be used to control the conduction of the fifth transistor T5. As in FIG. 28, when the fifth transistor T5 is an N-type transistor, the read control signal Scan4 is a high-level signal input to the gate of the fifth transistor T5, and the fifth transistor T5 may be turned on. On the contrary, when the read control signal Scan4 is a low-level signal input to the gate of the fifth transistor T5, and the fifth transistor T5 may be turned off. When the first detection module P1 completes the detection of biomolecules, the fifth transistor T5 may be controlled to switch from the off state to the on state through the read control signal Scan4 connected to the gate of the fifth transistor T5. The amplified change value of the Q point potential can be output from the output terminal OUT in the form of a current change value to obtain the detection result of the biomolecule. When the second detection module P2 completes the detection of fluorescence reaction, the fifth transistor T5 may be controlled to switch from the off state to the on state through the read control signal Scan4 connected to the gate of the fifth transistor T5. The amplified change value of the Q point potential can be output from the output terminal OUT in the form of a current change value to obtain the detection result of the fluorescence reaction.

In some embodiments, when the detection circuit is in operation, the conduction of the sixth transistor T6 may be controlled by the reset signal Scan3 connected to the gate of the sixth transistor T6 of the reset module P5 of each detection unit P, and the potential of the Q point may be reset. If the sensing operation of biomolecules needs to be performed, the first selection control signal Scan1 may be used to control the conduction of the first selection transistor T1. One of the gates of the organic transistor 20 may be connected to the sensing electrode 40, such that the sensing electrode 40 can be exposed to the to-be-detected solution and be in contact with the to-be-detected solution to adsorb the ionic or molecular structures in the to-be-detected solution. The other gate of the organic transistor 20 may be used to control the organic transistor 20 to operate in the sub-threshold range, thereby ensuring the conduction operation of the organic transistor 20. Molecules and ions in the to-be-detected solution may be adsorbed to the surface of the sensing electrode 40, thereby changing the potential of the sensing electrode 40. At this time, the voltage of one gate of the organic transistor 20 connected to the sensing electrode 40 may also change, resulting in a change in the output current through the organic transistor 20 and a change in the threshold voltage of the organic transistor 20, thereby changing the voltage of the two electrodes of the capacitor to realize the charging and discharging of the capacitor C, thereby causing the potential of the Q point to change. After the fourth transistor T4 of the amplification module P4 exponentially amplifies the change value of the potential of the Q point, the read control signal Scan4 connected to the gate of the fifth transistor T5 may control the fifth transistor T5 to switch from the off state to the on state. The amplified change value of the potential of the Q point may be output from the output terminal OUT in the form of a current change value to realize the sensing of biomolecular or ionic signals in the to-be-detected solution. If the detection of the fluorescence reaction is needed, the conduction of the second selection transistor T2 may be controlled by the second selection control signal Scan2. The photoelectric sensor element 30 may generate photogenerated carriers after receiving light, thereby charging and discharging the capacitor C, thereby changing the potential of the Q point. After the fourth transistor T4 of the amplification module P4 exponentially amplifies the change value of the potential of the Q point, the read control signal Scan4 connected to the gate of the fifth transistor T5 may be used to control the fifth transistor T5 to switch from the off state to the on state. The amplified change value of the potential of the Q point may be output from the output terminal OUT in the form of a current change value to realize the detection of fluorescence reaction.

In the detection circuit provided by the embodiments of the present disclosure, each detection unit P can realize the sensing of biological reactions in the fluid through the organic transistor 20 of the first detection module P1 and the sensing electrode 40 connected to the organic transistor 20. Further, each detection unit P can also realize the fluorescence reaction detection function of the substrate through the photoelectric sensor element 30 of the second detection module P2. In addition, the detection result can be amplified by the amplification module P4 and then read and output by the reading module P3, which not only realize the integration of biological reaction detection and fluorescence detection, thereby realizing the diversified detection functions of the same detection, but also help to improve the detection efficiency and detection accuracy.

Figure 29:
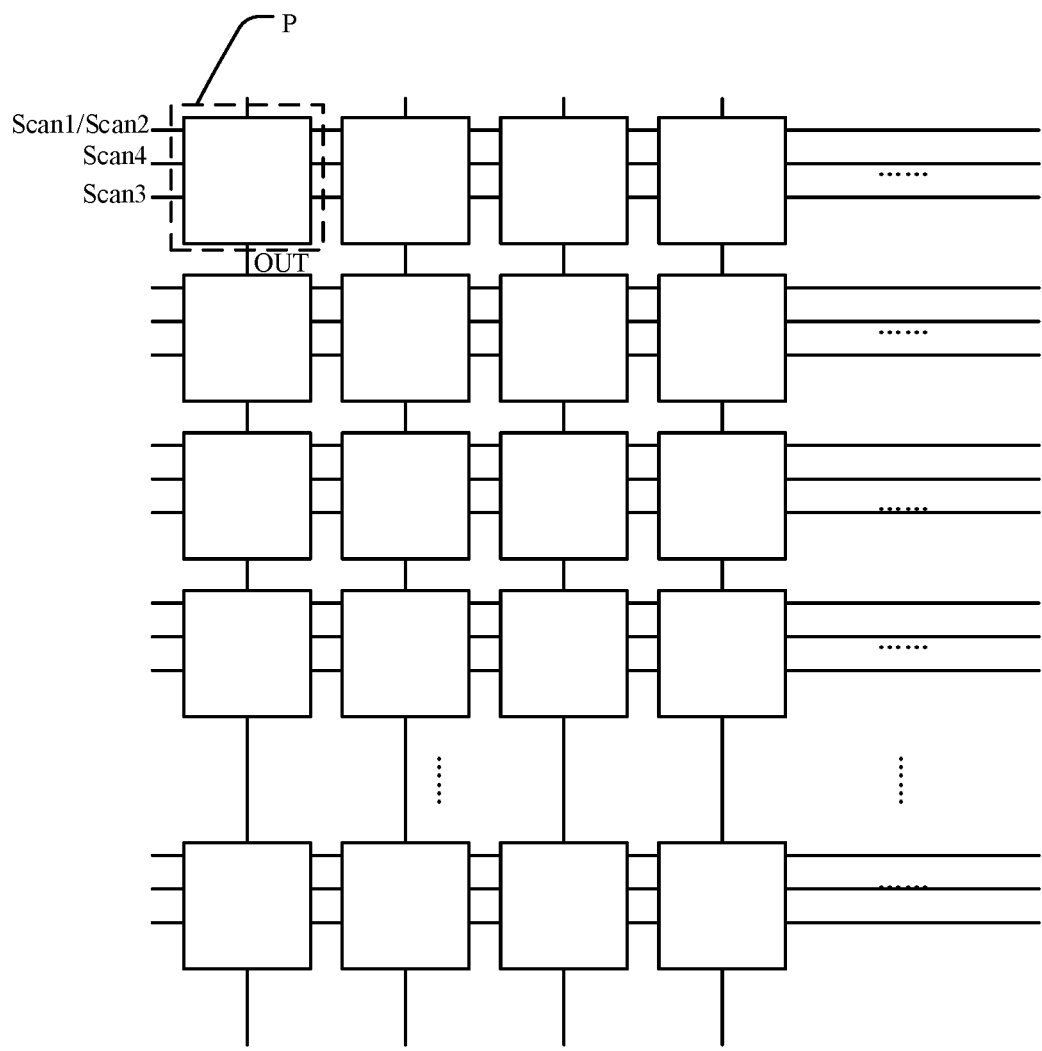
FIG. 29 is a schematic diagram of a connection structure of the detection circuit according to an embodiment of the present disclosure.
Figure 30:
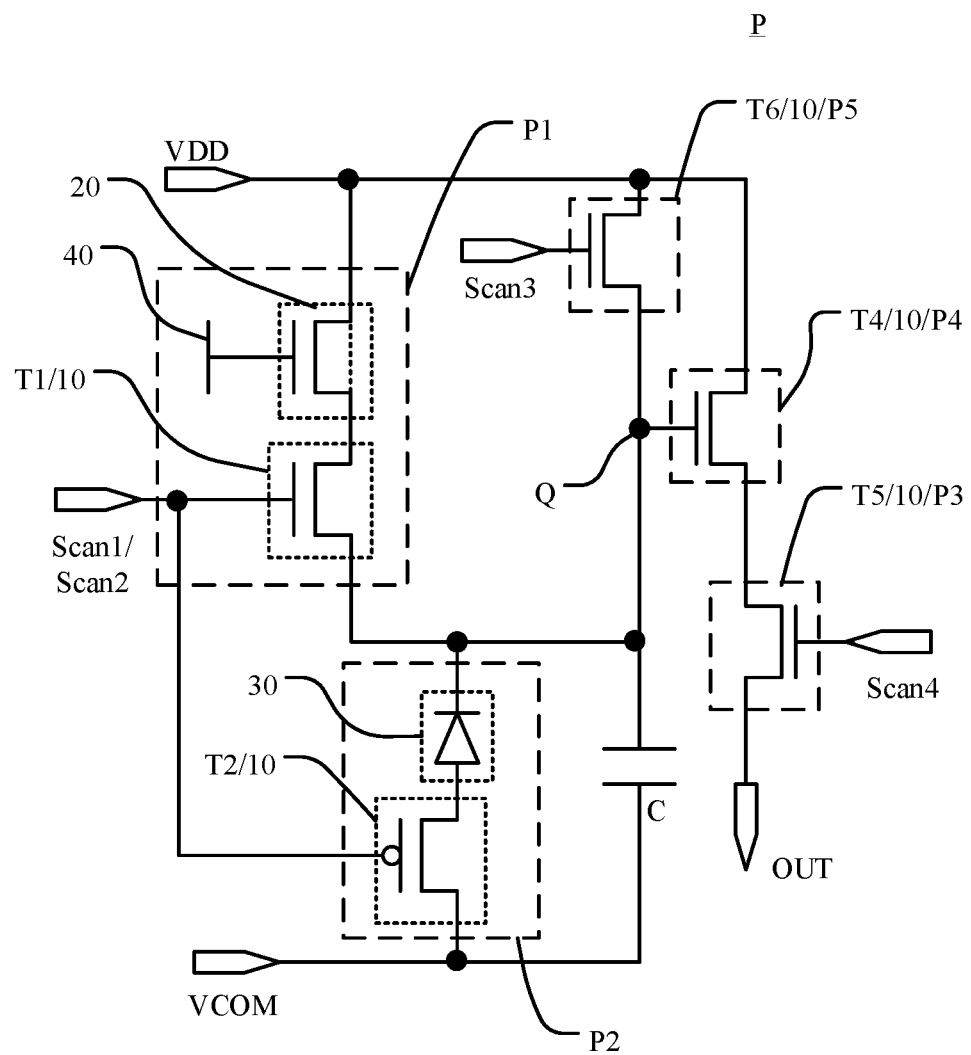
FIG. 30 is a schematic diagram of another electrical connection structure of the detection unit shown in FIG. 29.

FIG. 29 is a schematic diagram of a connection structure of the detection circuit according to an embodiment of the present disclosure, and FIG. 30 is a schematic diagram of another electrical connection structure of the detection unit shown in FIG. 29. Refer to FIG. 1, FIG. 26, FIG. 29, and FIG. 30. In some embodiments, the first selection transistor T1 and the second selection transistor T2 may be of different types. One of the first selection transistor T1 and the second selection transistor T2 may be an N-type transistor, and the other may be a P-type transistor. In addition, the gate of the first selection transistor T1 and the gate of the second selection transistor T2 may be connected.

In some embodiments, in the detection circuit, the first selection transistor T1 of the first detection module P1 and the second selection transistor T2 of the second detection module P2 may be of different types. That is, one of the first selection transistor T1 and the second selection transistor T2 may be an N-type transistor, and the other may be a P-type transistor. At this time, the gate of the first selection transistor T1 and the gate of the second selection transistor T2 may be connected together and controlled by the same control signal line. Since the types of the first selection transistor T1 and the second selection transistor T2 of the same detection unit P are different, if the same control signal connected to the gate of the first selection transistor T1 and the gate of the second selection transistor T2 is a high-level signal, only one of the first selection transistor T1 and the second selection transistor T2 may be turned on. Similarly, if the same control signal connected to the gate of the first selection transistor T1 and the gate of the second selection transistor T2 is a low-level signal, then only one of the first selection transistor T1 and the second selection transistor T2 may be turned on. In this way, the time-division detection of the first detection module P1 and the second detection module P2 can be realized, thereby realizing the effects of biological reaction detection and fluorescence detection of the detection circuit. In addition, when the gate of the first selection transistor T1 and the gate of the second selection transistor T2 are connected to the same control signal line, the number of signal lines connected to the detection circuit can be reduced. In this way, when the detection circuit is fabricated on the substrate 00 of the detection substrate 000, the number of signal lines in the detection substrate 000 can be reduced, thereby reducing the difficulty of wiring in the substrate.

It should be understood that in the embodiment of FIG. 30, the first selection transistor T1 is an N-type transistor and the second selection transistor T2 is a P-type transistor as an example for illustration. During specific implementations, the first selection transistor T1 can also be a P-type transistor and the second selection transistor T2 can also be an N-type transistor, which is not limited in the embodiments of the present disclosure.

Figure 31:
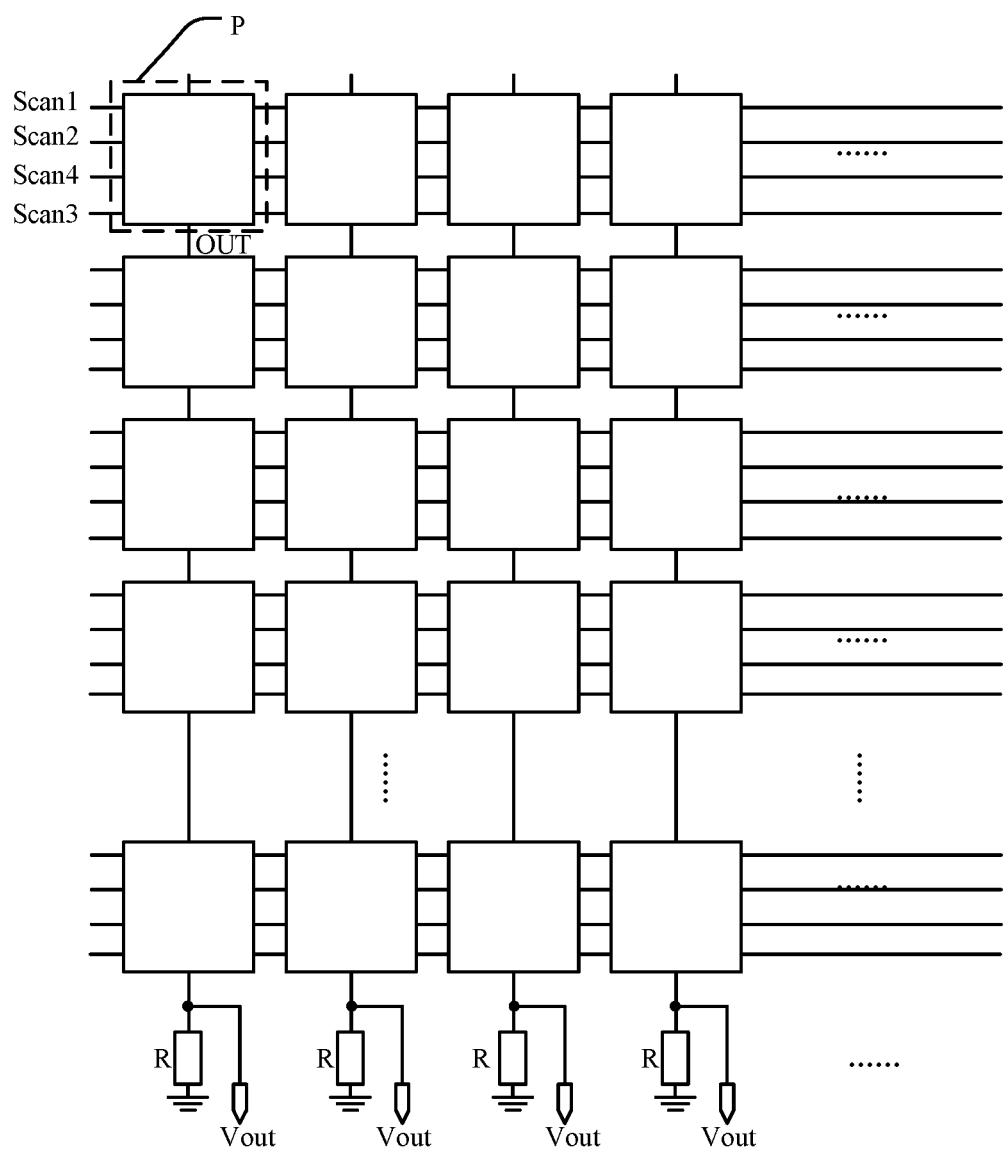
FIG. 31 is a schematic diagram of another connection structure of the detection circuit according to an embodiment of the present disclosure.

FIG. 31 is a schematic diagram of another connection structure of the detection circuit according to an embodiment of the present disclosure. Refer to FIG. 1, FIG. 26, FIG. 28, and FIG. 31. In some embodiments, a plurality of reading modules P3 of the same column of the detection unit P may be connected to the same detection terminal Vout, and the detection terminal Vout may be connected to a fixed resistor R.

In some embodiments, in the detection circuit, each detection unit P may be arranged in an array. The plurality of reading modules P3 of the same column of the detection units P may be connected to the same detection terminal Vout, and output the detection results. In some embodiments, the detection terminal Vout may be connected to a fixed resistor R, and the fixed resistor R set in each column of the detection units P may convert the change of the potential of the Q point into a voltage value and output the voltage value from the detection terminal Vout. For example, when the first detection module P1 of the detection circuit detects biomolecules, and the ion concentration in the to-be-detected solution changes, the gate voltage connected to the sensing electrode 40 in the organic transistor 20 of the first detection module P1 changes, the potential at the Q point changes, the current flowing through the fourth transistor T4 of the amplification module P4 changes, the fifth transistor T5 of the reading module P3 is turned on, and the current of the fifth transistor T5 also changes. Since the resistance of the fixed resistor R connected to the detection terminal Vout of each column of detection units P may be a constant value, and the change of the detected current value in the detection circuit can be obtained from the change of the detected voltage value output from the detection terminal Vout, the detection function of the ion concentration in the to-be-detected solution can be realized.

It can be understood that, in some other embodiments, the plurality of reading modules P3 of the same column of detection units P may be connected to the same detection terminal Vout. In this way, the current change value of the detection terminal Vout may be directly measured, and the detection function of the ion concentration in the to-be-detected solution can also be realized, which is not specifically limited in the embodiments of the present disclosure.

Figure 32:
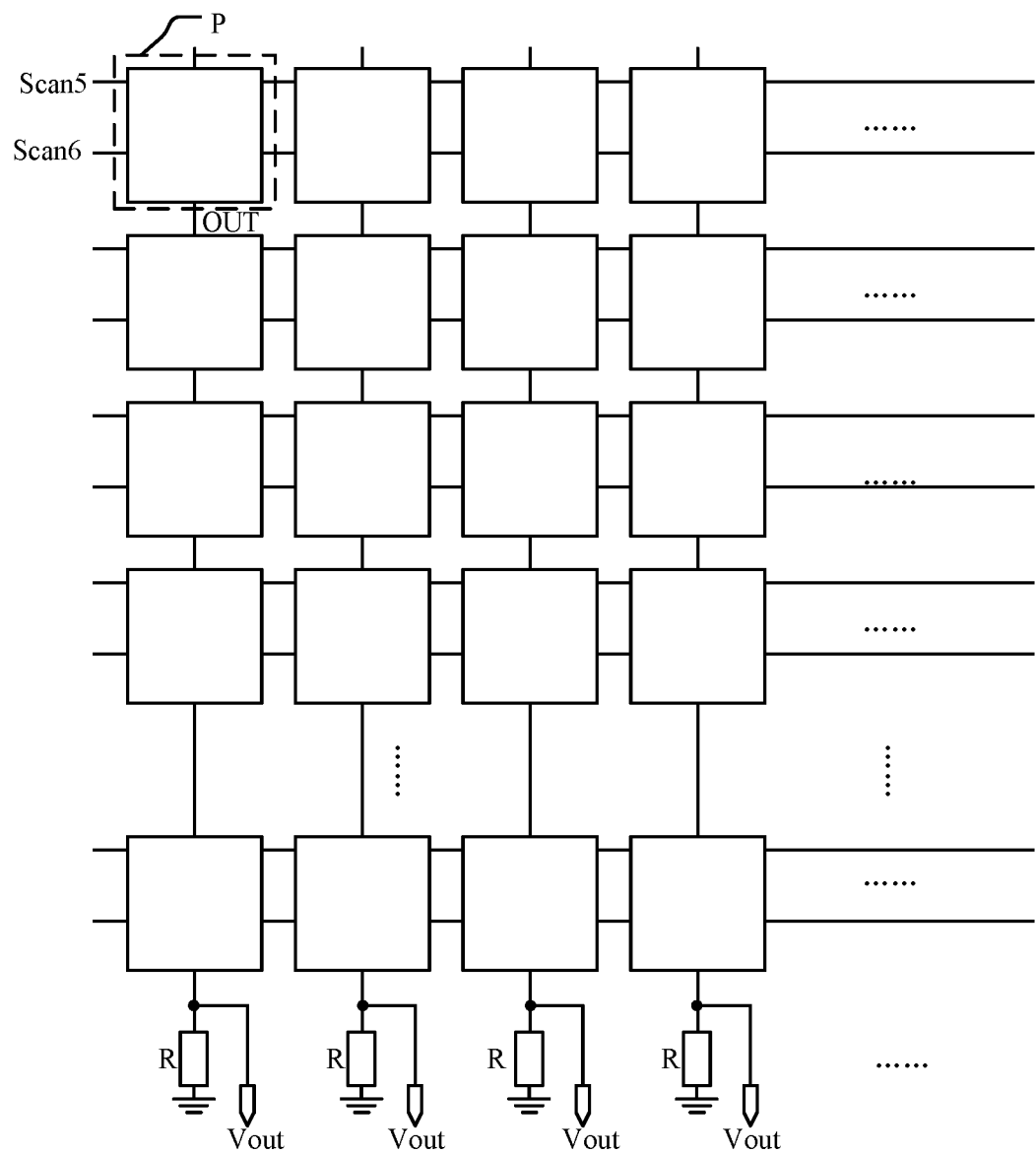
FIG. 32 is a schematic diagram of another connection structure of the detection circuit according to an embodiment of the present disclosure.
Figure 33:
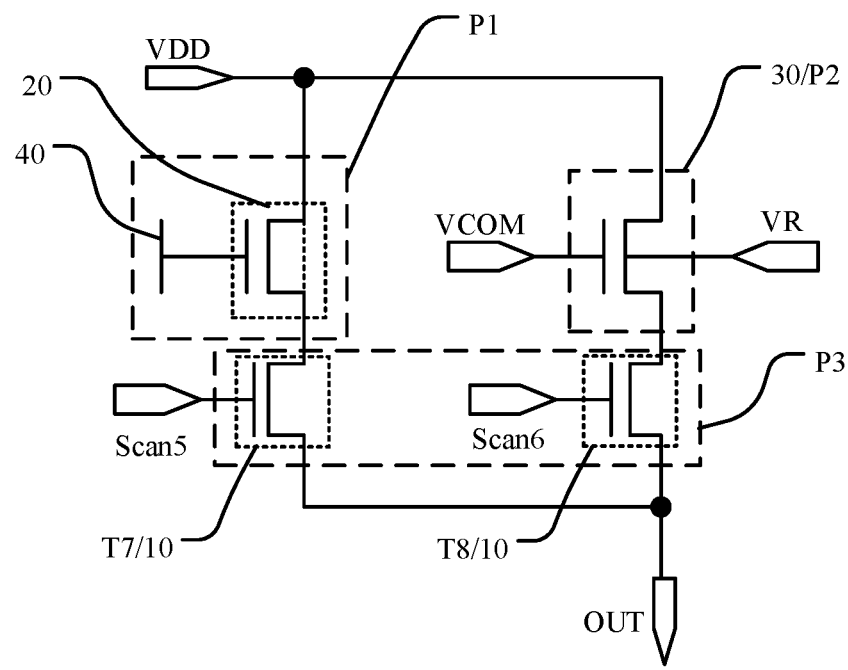
FIG. 33 is a schematic diagram of the electrical connection structure of one detection unit shown in FIG. 32.

FIG. 32 is a schematic diagram of another connection structure of the detection circuit according to an embodiment of the present disclosure, and FIG. 33 is a schematic diagram of the electrical connection structure of one detection unit shown in FIG. 32. Refer to FIG. 1, FIG. 32, and FIG. 33. In some embodiments, the photoelectric sensor element 30 may be a photosensitive transistor with a double-gate structure, and the photosensitive transistor may be a fin-gate transistor, and the reading module P3 may include a first reading transistor T7 and a second reading transistor T8. The gate of the first reading transistor T7 may be connected to a first read control signal Scan5, the first electrode of the first reading transistor T7 may be connected to the drain of the organic transistor 20, and the source of the organic transistor 20 may be connected to the first power supply signal VDD. The gate of the second reading transistor T8 may be connected to a second read control signal Scan6, the first electrode of the second reading transistor T8 may be connected to the drain of the fin-gate transistor (that is, the photoelectric sensor element 30), and the source of the fin-gate transistor may be connected to the first power supply signal VDD. In some embodiments, the first reading transistor T7 and the second reading transistor T8 may be both inorganic transistors 10.

In some embodiments, the photoelectric sensor element 30 may include a fin-gate transistor with a double-gate structure. The bottom gate of the fin-gate transistor may be connected a bias voltage signal VR, and the top gate of the fin-gate transistor may be connected to the second power supply signal VCOM.

In some embodiments, the photoelectric sensor element 30 of the second detection module P2 may be a photosensitive transistor with a double-gate structure, and the photosensitive transistor may be a fin-gate transistor. That is, the photoelectric sensor element 30 may be a fin-gate transistor with a double-gate structure. The bottom gate of the fin-gate transistor may be connected a bias voltage signal VR, and the top gate of the fin-gate transistor may be connected to the second power supply signal VCOM. In this way, the fin-gate transistor may work under the voltage difference formed by the voltage value of the bias voltage signal VR and the voltage value of the second power supply signal VCOM. In this embodiment, by setting the photosensitive transistor used as the photoelectric sensor element 30 as a fin-gate transistor, the light receiving area of the active part of the photosensitive transistor can be greatly increased compared to the common photosensitive transistor whose active part has a planar structure as a whole. In this way, the light absorption capability of the photoelectric sensor element 30 can be greatly enhanced with this structure to realize high-sensitivity optical signal sensing. At this time, there may be no need to arrange an amplification module in the detection circuit. Compared with the PIN-type photodiode, the photoelectric sensor element 30 of the fin-gate transistor has a more significant photoelectric conversion gain, which can achieve an optical signal gain of $10^2$ to $10^4$ times. Therefore, there may be no need to amplify and output the detection signal, and the detection result may be directly read and output through the reading module P3, which is beneficial to reducing the structure of the detection unit P and increasing the layout space of the detection circuit.

Figure 34:
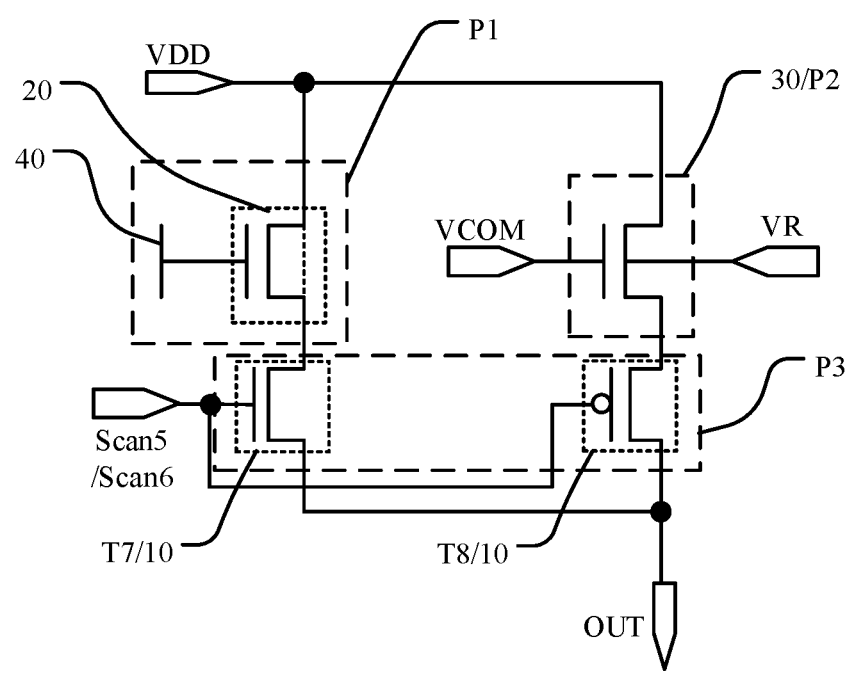
FIG. 34 is a schematic diagram of another electrical connection structure of one detection unit shown in FIG. 32.

In some embodiments, the reading module P3 may include the first reading transistor T7. The first electrode of the first reading transistor T7 may be connected to drain of the organic transistor 20, the source electrode of the organic transistor 20 may be connected to the first power supply signal VDD, and the gate of the first reading transistor T7 may be connected to the first read control signal Scan5. The first read control signal Scan5 may be used to control the conduction of the first reading transistor T7. As shown in FIG. 32, when the first reading transistor T7 is an N-type transistor, the first read control signal Scan5 is a high-level signal input to the gate of the first reading transistor T7, and the first reading transistor T7 may be turned on. On the contrary, when the first read control signal Scan5 is a low-level signal input to the gate of the first reading transistor T7, and the first reading transistor T7 may be turned off. When the organic transistor 20 and the sensing electrode 40 of the first detection module P1 perform biomolecule sensing, the sensing electrode 40 may be exposed to the to-be-detected solution and be in contact with the to-be-detected solution to adsorb the ionic or molecular structures in the to-be-detected solution. The other gate of the organic transistor 20 may be used to control the organic transistor 20 to operate in the sub-threshold range, thereby ensuring the conduction operation of the organic transistor 20. Molecules and ions in the to-be-detected solution may be adsorbed to the surface of the sensing electrode 40, thereby changing the potential of the sensing electrode 40. At this time, the voltage of one gate of the organic transistor 20 connected to the sensing electrode 40 may also change, resulting in a change in the output current through the organic transistor 20 and a change in the threshold voltage of the organic transistor 20. At this time, the first reading transistor T7 may be controlled to be tuned on by the first read control signal Scan5, and the current change value in the circuit of the detection unit P may be output from the output terminal OUT through the first reading transistor T7, thereby realizing the sensing of biomolecular or ionic signals in the to-be-detected solution. In some embodiments, the reading module P3 may further include the second reading transistor T8. The gate of the second reading transistor T8 may be connected to the second read control signal Scan6, the first electrode of the second reading transistor T8 may be connected to the drain of the fin-gate transistor (that is, the photoelectric sensor element 30), and the source of the fin-gate transistor may be connected to the first power supply signal VDD. The second read control signal Scan6 may be used to control the conduction of the second reading transistor T8. As shown in FIG. 32, when the first reading transistor T8 is an N-type transistor, the second read control signal Scan6 is a high-level signal input to the gate of the second reading transistor T8, and the second reading transistor T8 may be turned on. On the contrary, when the second read control signal Scan6 is a low-level signal input to the gate of the second reading transistor T8, and the second reading transistor T8 may be turned off. When the fin-gate transistor of the second detection module P2 serving as the photoelectric sensor element 30 performs the sensing operation of biomolecules, the amorphous silicon active part of the fin-gate transistor may change the current flowing through the fin-gate transistor after receiving light. At this time, the second reading transistor T8 may be controlled to be turned on by the second read control signal Scan6, and the current change value in the circuit of the detection unit P may be output from the output terminal OUT through the second reading transistor T8, thereby realizing the detection of the fluorescence reaction. Since the first reading transistor T7 and the second reading transistor T8 may only need to play a switching role, these transistors may both be the inorganic transistor 10 structure commonly used in circuit structures, which is beneficial to reduce the difficulty of the circuit structure fabrication process FIG. 34 is a schematic diagram of another electrical connection structure of one detection unit shown in FIG. 32. Refer to FIG. 1, FIG. 32, and FIG. 34. In some embodiments, the first reading transistor T7 and the second reading transistor T8 may be of different types. One of the first reading transistor T7 and the second reading transistor T8 may be an N-type transistor, and the other may be a P-type transistor. In addition, the gate of the first reading transistor T7 and the gate of the second reading transistor T8 may be connected.

In some embodiments, in the detection circuit, the first reading transistor T7 and the second reading transistor T8 may be of different types. That is, one of the first reading transistor T7 and the second reading transistor T8 may be an N-type transistor, and the other may be a P-type transistor. At this time, the gate of the first reading transistor T7 and the gate of the second reading transistor T8 may be connected together and controlled by the same control signal line. Since the types of the first reading transistor T7 and the second reading transistor T8 of the same detection unit P are different, if the same control signal connected to the gate of the first reading transistor T7 and the gate of the second reading transistor T8 is a high-level signal, only one of the first reading transistor T7 and the second reading transistor T8 may be turned on. Similarly, if the same control signal connected to the gate of the first reading transistor T7 and the gate of the second reading transistor T8 is a low-level signal, then only one of the first reading transistor T7 and the second reading transistor T8 may be turned on. In this way, the time-division detection of the first detection module P1 and the second detection module P2 can be realized, thereby realizing the effects of biological reaction detection and fluorescence detection of the detection circuit. In addition, when the gate of the first reading transistor T7 and the gate of the second reading transistor T8 are connected to the same control signal line, the number of signal lines connected to the detection circuit can be reduced. In this way, when the detection circuit is fabricated on the substrate 00 of the detection substrate 000, the number of signal lines in the detection substrate 000 can be reduced, thereby reducing the difficulty of wiring in the substrate.

It should be understood that in the embodiment of FIG. 34, the first reading transistor T7 is an N-type transistor and the second reading transistor T8 is a P-type transistor as an example for illustration. During specific implementations, the first reading transistor T7 can also be a P-type transistor and the second reading transistor T8 can also be an N-type transistor, which is not limited in the embodiments of the present disclosure.

Consistent with the present disclosure, the detection substrate provided by the embodiments of the present disclosure may include a substrate and a plurality of detection units located on one side of the substrate. The detection unit at least includes an inorganic transistor and an organic transistor, and the organic transistor may be connected to a sensing electrode. Due to the small leakage of the inorganic transistors, the inorganic transistors can be used as switch tubes for the detection unit to start detection, while the organic transistors have large sub-threshold swings and large leakage, which can be used as sensing elements for biomolecules. The organic transistor of the detection unit can be connected to the sensing electrode. The sensing electrode can be a biomolecule or an ion-sensitive electrode. The ions in the to-be-detected solution can be easily adsorbed to the surface of the sensing electrode, thereby changing the potential of the sensing electrode. Therefore, the organic transistor in the present disclosure and the sensing electrode connected to the organic transistor can be used for the detection unit to detect biomolecules. The detection unit may further include a photoelectric sensor element. The photoelectric sensor element may realize the detection function of the fluorescence reaction under the action of the switch tube of the inorganic transistor. The organic transistor of the present disclosure may at least include an organic semiconductor part. In the direction perpendicular to the plane of the substrate, the film layer where the organic semiconductor part is located may be located on the side of the film layer where the inorganic transistor is located away from the substrate, and the film layer where the organic semiconductor part is located may be located on the side of the film layer where the photoelectric sensor element is located away from the substrate. In the fabrication process of the detection substrate, it is necessary to fabricate the film layer structure of the inorganic transistor and the photoelectric sensor element on the substrate, and then fabricate the organic semiconductor structure of the organic transistor. Since the inorganic transistors and the photoelectric sensor elements are generally fabricated by high-temperature processes and organic transistors can only be fabricated by a low-temperature process, if the film layer structure of the organic semiconductor part where the organic transistor is arranged is located under the film layer where the inorganic transistor is located and the film layer where the photoelectric sensor element is located, when the inorganic transistor is fabricated by a high-temperature process, the high temperature of the inorganic transistor will affect the fabrication of the organic semiconductor part, which affect the performance of the organic transistor, such that the performance of the organic transistor may be affected or even fail. The detection substrate provided by the embodiments of the present disclosure can not only realize the sensing of biological reactions in the fluid through the organic transistor and the sensing electrode connected thereto, but can also realize the fluorescence reaction detection function of the substrate through the photoelectric sensor element, thereby realizing the integration of biological reaction detection and fluorescence detection. In addition, the layers of different structures in the detection unit can be reasonably arranged. More specifically, the film layer structure of the organic semiconductor part of the organic transistor of the low-temperature process can be fabricated after the film layer structures of the inorganic transistor and the photoelectric sensor element of the high-temperature processes are fabricated on the substrate, thereby avoiding the performance failure of the fabricated organic transistor due to high temperature, which is beneficial to realizing the diversified detection functions of the same substrate through the integration of biological reaction detection and fluorescence detection, thereby improving the detection efficiency of the detection substrate, and at the same time, ensuring the product yield of the detection substrate and the accuracy of the detection results.

Although some specific embodiments of the present disclosure are described by examples in detail, those skilled in the art should understand that the above examples are only schematic and are not intended to limit the scope of the present disclosure. Those skilled in the art should understand that the above embodiments may be modified without deviating from the scope and spirit of the present disclosure. The scope of the disclosure is defined by the attached claims.

What is claimed is:

1. A detection substrate comprising:
    a substrate; and
    a plurality of detection units disposed on a side of the substrate, each detection unit including at least an inorganic transistor, an organic transistor, and a photoelectric sensor element, the organic transistor including an organic semiconductor part, in a direction perpendicular to a plane of the substrate, a film layer where the organic semiconductor part is located being located on the side of the film layer where the inorganic transistor is located away from the substrate, the film layer where the organic semiconductor part is located being located on the side of a film layer where the photoelectric sensor element is located away from the substrate, the organic transistor of the detection unit being connected to a sensing electrode, the sensing electrode being located on the side of the film layer where the inorganic transistor is located away from the substrate.

2. The detection substrate of claim 1, wherein:
    the organic transistor is a double-gate organic transistor including a first gate and a second gate, a film layer where the first gate is located being located on the side of a film layer where the second gate is located facing the substrate, the first gate being connected to the sensing electrode.

3. The detection substrate of claim 2, wherein:
    in the direction perpendicular to the plane of the substrate, the organic transistor and the photoelectric sensor element do not overlap each other.

4. The detection substrate of claim 3, further comprising:
    a first metal layer, a first active layer, a second metal layer, a first electrode layer, a third metal layer, and a fourth metal layer on the side of the substrate, wherein:
    a gate of the inorganic transistor is located in the first metal layer, an active part of the inorganic transistor is located in the first active layer, and a source and a drain of the inorganic transistor are located in the second metal layer;
    the sensing electrode is located in the first electrode layer, and the sensing electrode is connected to the first gate of the organic transistor through a first via; and
    a source and a drain of the organic transistor are located in the third metal layer, an active of the organic transistor is located in the second active layer, and the second gate of the organic transistor is located in the fourth metal layer.

5. The detection substrate of claim 4, wherein:
    the film layer where the photoelectric sensor element is located is located on the side of the film layer where the inorganic transistor is located away from the substrate, and the film layer where the organic semiconductor part is located is located on the side of the film layer where the photoelectric sensor element is located away from the substrate.

6. The detection substrate of claim 5, wherein:
    the photoelectric sensor element includes a N-type semiconductor part, an intrinsic semiconductor part, and a P-type semiconductor part arranged in a stack, the intrinsic semiconductor part being located between the N-type semiconductor part and the P-type semiconductor part, the N-type semiconductor part being connected to the drain of at least one of the inorganic transistors through a second via.

7. The detection substrate of claim 6, wherein:
    the first electrode layer includes a bias voltage line, the bias voltage line being connected to the P-type semiconductor part through a third via.

8. The detection substrate of claim 4, wherein:
    the photoelectric sensor element includes a photosensitive transistor, the photosensitive transistor including a third gate and a fourth gate, a film layer where the third gate is located being located on the side of a film layer where the fourth gate is located facing the substrate.

9. The detection substrate of claim 8, wherein:
    the photosensitive transistor is a fin-gate transistor and the fourth gate has a fin-gate structure, an active part of the fin-gate transistor including a first body and a first bump located on a side of the first body away from the substrate.

10. The detection substrate of claim 9, wherein:
    the third gate of the fin-gate transistor is located in the first metal layer, the active part of the fin-gate transistor is located in the first active layer, and a source and a drain of the fin-gate transistor are located in the second metal layer; and
    the fourth gate of the fin-gate transistor is located in the first electrode layer, and an orthographic projection of the fourth gate of the fin-gate transistor on the plane of the substrate covers an orthographic projection of the first bump on the plane of the substrate.

11. The detection substrate of claim 10, wherein:
    the first active layer includes metal oxide, and the third gate of the photosensitive transistor is located in the second metal layer;
    the active part of the photosensitive transistor includes amorphous silicon material, and the film layer where the active part of the photosensitive transistor is located is located on the side of the second metal layer away from the substrate; and
    the film layer where the source and the drain of the photosensitive transistor are located is located on the side of the film layer where the active part of the photosensitive transistor is located away from the substrate.

12. The detection substrate of claim 10, wherein:
    the first active layer is made of low temperature polysilicon, and the first active layer is located on the side of the first metal layer close to the substrate;
    the third gate of the photosensitive transistor is located in the first metal layer;
    the active part of the photosensitive transistor includes amorphous silicon material, and the film layer where the active part of the photosensitive transistor is located is located on the side of the first metal layer away from the substrate; and the film layer where the source and the drain of the photosensitive transistor are located is located in the second metal layer.

13. The detection substrate of claim 4, wherein:
the first electrode layer includes a first connection, the source of the organic transistor being connected to the drain of at least one of the inorganic transistors through the first connection.

14. The detection substrate of claim 2, wherein:
in the direction perpendicular to the plane of the substrate, the organic transistor and the photoelectric sensor element at least partially overlap; and
an area of an orthographic projection of the photoelectric sensor element on the plane of the substrate is larger than an area of an orthographic projection of the organic transistor on the plane of the substrate.

15. The detection substrate of claim 2, wherein:
the film layer where the first gate of the organic transistor is located is located on the side of the film layer where the photoelectric sensor element is located away from the substrate.

16. The detection substrate of claim 4, further comprising:
a fifth metal layer, the fifth metal layer being located between the first electrode layer where the sensing electrode is located and the film layer where the photoelectric sensor element is located, the first gate of the organic transistor being located in the fifth metal layer.

17. The detection substrate of claim 1, further comprising:
a first protective layer, the first protective layer being located on the side of the film layer where the organic transistor is located away from the substrate, the first protective layer including a first via, the first via penetrating at least part of the first protective layer, part of the sensing electrode being exposed through the first via.

18. The detection substrate of claim 17, wherein:
the first protective layer further includes a plurality of second vias, the plurality of second vias penetrating at least part of the first protective layer, in the direction perpendicular to the plane of the substrate, the plurality of second vias at least partially overlapping with the photoelectric sensor element.

19. The detection substrate of claim 18, wherein:
the first protective layer further includes a plurality of microprism structures, in the direction perpendicular to the plane of the substrate, the plurality of microprism structures at least partially overlap with the photoelectric sensor element.

20. The detection substrate of claim 1, wherein:
the detection unit further includes a light-emitting element, a film layer where the light-emitting element is located being located between the film layer where the organic semiconductor part is located and the film layer where the inorganic transistor is located, an anode of the light-emitting element being connected to the drain of at least one of the inorganic transistors through a second connection, the second connection being arranged in the same layer as the sensing electrode.

* * * * *